United States Patent
Mishra et al.

(10) Patent No.: US 10,997,114 B2
(45) Date of Patent: May 4, 2021

(54) VECTOR DECODING IN TIME-CONSTRAINED DOUBLE DATA RATE INTERFACE

(71) Applicant: QUALCOMM Incorporated, San Diego, CA (US)

(72) Inventors: Lalan Jee Mishra, San Diego, CA (US); Richard Dominic Wietfeldt, San Diego, CA (US); Helena Deirdre O'Shea, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 16/393,081

(22) Filed: Apr. 24, 2019

(65) Prior Publication Data

US 2019/0377701 A1 Dec. 12, 2019

Related U.S. Application Data

(60) Provisional application No. 62/682,353, filed on Jun. 8, 2018, provisional application No. 62/682,361, filed on Jun. 8, 2018, provisional application No. 62/682,371, filed on Jun. 8, 2018.

(51) Int. Cl.
*G06F 13/42* (2006.01)
*G06F 1/12* (2006.01)
*G06F 13/364* (2006.01)

(52) U.S. Cl.
CPC ........ *G06F 13/4291* (2013.01); *G06F 13/364* (2013.01); *G06F 2213/0016* (2013.01)

(58) Field of Classification Search
CPC ............... G06F 13/364; G06F 13/4291; G06F 2213/0016
See application file for complete search history.

(56) References Cited

U.S. PATENT DOCUMENTS

| | | | | |
|---|---|---|---|---|
| 6,195,764 | B1* | 2/2001 | Caldara | G06T 9/005 703/13 |
| 8,103,896 | B2* | 1/2012 | Deshpande | G06F 1/08 713/400 |
| 2009/0024781 | A1* | 1/2009 | Heizmann | G06F 1/10 710/305 |

* cited by examiner

*Primary Examiner* — Nitin C Patel
(74) *Attorney, Agent, or Firm* — Holland & Hart LLP

(57) ABSTRACT

Systems, methods, and apparatus for improving throughput of a serial bus are described. A method performed at a device coupled to a serial bus includes detecting a transition in signaling state of a first wire of the serial bus while a first pair of consecutive bits is being received from the first wire of the serial bus, determining that no transition in signaling state of the first wire occurred while a second pair of consecutive bits is being received from the first wire, defining bit values for the first pair of consecutive bits based on direction of the transition in signaling state detected while the first pair of consecutive bits is being received, and sampling the signaling state of the first wire while the second pair of consecutive bits is being received to obtain a bit value used to represent both bits in the second pair of consecutive bits.

30 Claims, 24 Drawing Sheets

VECTOR DECODING IN TIME-CONSTRAINED DOUBLE DATA RATE INTERFACE

PRIORITY CLAIM

This application claims priority to and the benefit of U.S. Provisional Patent Application Ser. No. 62/682,353 filed in the U.S. Patent Office on Jun. 8, 2018, U.S. Provisional Patent Application Ser. No. 62/682,361 filed in the U.S. Patent Office on Jun. 8, 2018, and U.S. Provisional Patent Application Ser. No. 62/682,371 filed in the U.S. Patent Office on Jun. 8, 2018, the entire content of these applications being incorporated herein by reference as if fully set forth below in its entirety and for all applicable purposes.

TECHNICAL FIELD

The present disclosure relates generally to serial communication over a shared serial bus and, more particularly, to optimizing latencies associated with time-critical data transmitted over the shared serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bur or a parallel bus. General-purpose serial interfaces known in the industry, including the Inter-Integrated Circuit (I2C or I²C) serial bus and its derivatives and alternatives, including interfaces defined by the Mobile Industry Processor Interface (MIPI) Alliance, such as the Improved Inter-Integrated Circuit (I3C) and the Radio Frequency Front-End (RFFE) interface.

In one example, the I3C serial bus is a serial bus that was intended for use in connecting sensors and other peripherals to a processor. In some implementations, multiple bus masters are coupled to the serial bus such that two or more devices can serve as bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links. In another example, system power management interface (SPMI) defined by the MIPI Alliance provides a hardware interface that may be implemented between baseband or application processors and peripheral components. In some implementations, the SPMI is deployed to support power management operations within a device.

In many instances, a multi-drop serial interface may be provided to support high-priority, low-latency communication between an application processor and certain peripherals, and other lower-priority communication. Latency can be adversely affected when multiple devices coupled to the serial bus are concurrently active. Degraded latencies can lead to an increase in dropped packets, session timeouts and retransmissions on the serial bus. As mobile communication devices continue to include a greater functionalities, improved serial communication techniques are needed to improve latencies and/or handling of priority traffic on a serial bus that couples peripherals and processors.

SUMMARY

Certain aspects of the disclosure relate to systems, apparatus, methods and techniques that can support increased data rates for a serial bus without increasing bus clock frequency and without modifying encoding of the data transmitted on the data line.

In various aspects of the disclosure, a method performed at a device coupled to a serial bus includes detecting a transition in signaling state of a first wire of the serial bus while a first pair of consecutive bits is being received from the first wire of the serial bus, determining that no transition in signaling state of the first wire occurred while a second pair of consecutive bits is being received from the first wire, defining bit values for the first pair of consecutive bits based on direction of the transition in signaling state detected while the first pair of consecutive bits is being received, and sampling the signaling state of the first wire while the second pair of consecutive bits is being received to obtain a bit value used to represent both bits in the second pair of consecutive bits. In some instances, the first pair of consecutive bits may be received in a double data rate signal.

In one aspect, the transition in the signaling state of the first wire occurs when the first pair of consecutive bits have different bit values.

In one aspect, the first pair of consecutive bits is received during a first cycle of a clock signal transmitted on a second wire of the serial bus, and wherein the transition in the signaling state of the first wire is detected during a sampling window associated with the first cycle of the clock signal and defined for a single data rate protocol. The second pair of consecutive bits may be received during a second cycle of the clock signal transmitted on the second wire of the serial bus. The signaling state of the first wire may be sampled during a sampling window that is associated with the second cycle of the clock signal and defined for the single data rate protocol.

In one aspect, the first pair of consecutive bits and the second pair of consecutive bits may be combined in a first plurality of bits at a data decoder circuit. The bit values in the first pair of consecutive bits and the second pair of consecutive bits may be binarily inverted when transmissions on the serial bus are polarity inverted. An edge detection signal received by the data decoder circuit may be used to select between bit values for each pair of consecutive bits from bit values obtained by sampling the signaling state of the first wire and bit values defined based on direction of a transition in the signaling state while the second pair of consecutive bits is being received. A second plurality of bits may be decoded from an encoded clock signal received from a second wire of the serial bus. The clock signal may be encoded using pulse-width modulation or phase encoding. The first plurality of bits with the second plurality of bits may be combined to obtain at least two bytes of data. The clock signal may provide timing used for decoding the first plurality of bits. Each of the second plurality of bits may be encoded in direction of transition of edges in the clock signal. The first plurality of bits may be combined with the second plurality of bits by interleaving a first plurality of bits with a second plurality of bits to obtain a first received data byte and a second received data byte. At least two bytes of data may be sequentially received from the serial bus. At least two bytes of data may be transmitted independently such that a transmission error affecting a first byte of the at least two bytes of data does not affect a second byte of the at least two bytes of data.

In some examples, the serial bus is operated in accordance with an I3C single data rate data protocol, an RFFE single data rate data protocol or an SPMI single data rate data protocol. In other examples, the serial bus is operated in accordance with an I3C double data rate data protocol, an RFFE double data rate data protocol or an SPMI double data rate data protocol.

In various aspects of the disclosure, an apparatus has an interface circuit adapted to couple the apparatus to a serial bus, a transition detector circuit and a state sampling circuit. The transition detector circuit may be configured to detect a transition in signaling state of a first wire of the serial bus while a first pair of consecutive bits is being received from the first wire of the serial bus, and determine that no transition in signaling state of the first wire occurred while a second pair of consecutive bits is being received from the first wire. The state sampling circuit may be configured to sample the signaling state of the first wire while the second pair of consecutive bits is being received, and provide a sampled bit value derived from the sampled signaling state to represent bit value for both bits in the second pair of consecutive bits.

In various aspects of the disclosure, a processor-readable storage medium has instructions stored thereon which, when executed by at least one processor or state machine of a processing circuit, cause the processing circuit to detect a transition in signaling state of a first wire of a serial bus while a first pair of consecutive bits is being received from the first wire, determine that no transition in signaling state of the first wire occurred while a second pair of consecutive bits is being received from the first wire, define bit values for the first pair of consecutive bits based on direction of the transition in signaling state detected while the first pair of consecutive bits is being received, and sample the signaling state of the first wire while the second pair of consecutive bits is being received to obtain a bit value used to represent both bits in the second pair of consecutive bits.

In various aspects of the disclosure, a method performed at a device coupled to a serial bus includes encoding primary data in a data signal to be transmitted over a first wire of a serial bus, and providing a phase-encoded clock signal to be transmitted over a second wire of the serial bus. The phase-encoded clock signal may provide a plurality of edges indicating when bits of the primary data are to be sampled from the first wire. Secondary data may be encoded in the direction of transition of the plurality of edges.

In one aspect, the method includes providing an internal clock signal that controls timing of communication over the serial bus, and transmitting the data signal over the first wire of the serial bus such that one bit of data is transmitted for each clock cycle of the internal clock signal. The method may include phase encoding the internal clock signal using the secondary data to generate the phase-encoded clock signal to be transmitted over the second wire of the serial bus. Each of the plurality of edges occurs at a mid-point of a corresponding clock cycle of the internal clock signal.

In some examples, the serial bus is operated in accordance with an I3C single data rate data protocol, an RFFE single data rate data protocol or an SPMI single data rate data protocol. In other examples, the serial bus is operated in accordance with an I3C double data rate data protocol, an RFFE double data rate data protocol or an SPMI double data rate data protocol.

In various aspects of the disclosure, an apparatus has an interface circuit adapted to couple the apparatus to a serial bus and a first data encoder and a second data encoder. The first data encoder may be configured to encode primary data in a data signal to be transmitted over a first wire of the serial bus. The second data encoder may be configured to provide a phase-encoded clock signal to be transmitted over a second wire of the serial bus. The phase-encoded clock signal may provide a plurality of edges indicating when bits of the primary data are to be sampled from the first wire. Secondary data may be encoded in direction of transition of the plurality of edges.

In various aspects of the disclosure, a processor-readable storage medium has instructions stored thereon which, when executed by at least one processor or state machine of a processing circuit, cause the processing circuit to encode primary data in a data signal to be transmitted over a first wire of a serial bus, and provide a phase-encoded clock signal to be transmitted over a second wire of the serial bus. The phase-encoded clock signal may provide a plurality of edges indicating when bits of the primary data are to be sampled from the first wire. Secondary data may be encoded in the direction of transition of the plurality of edges.

DETAILED DESCRIPTION

Figure 1:
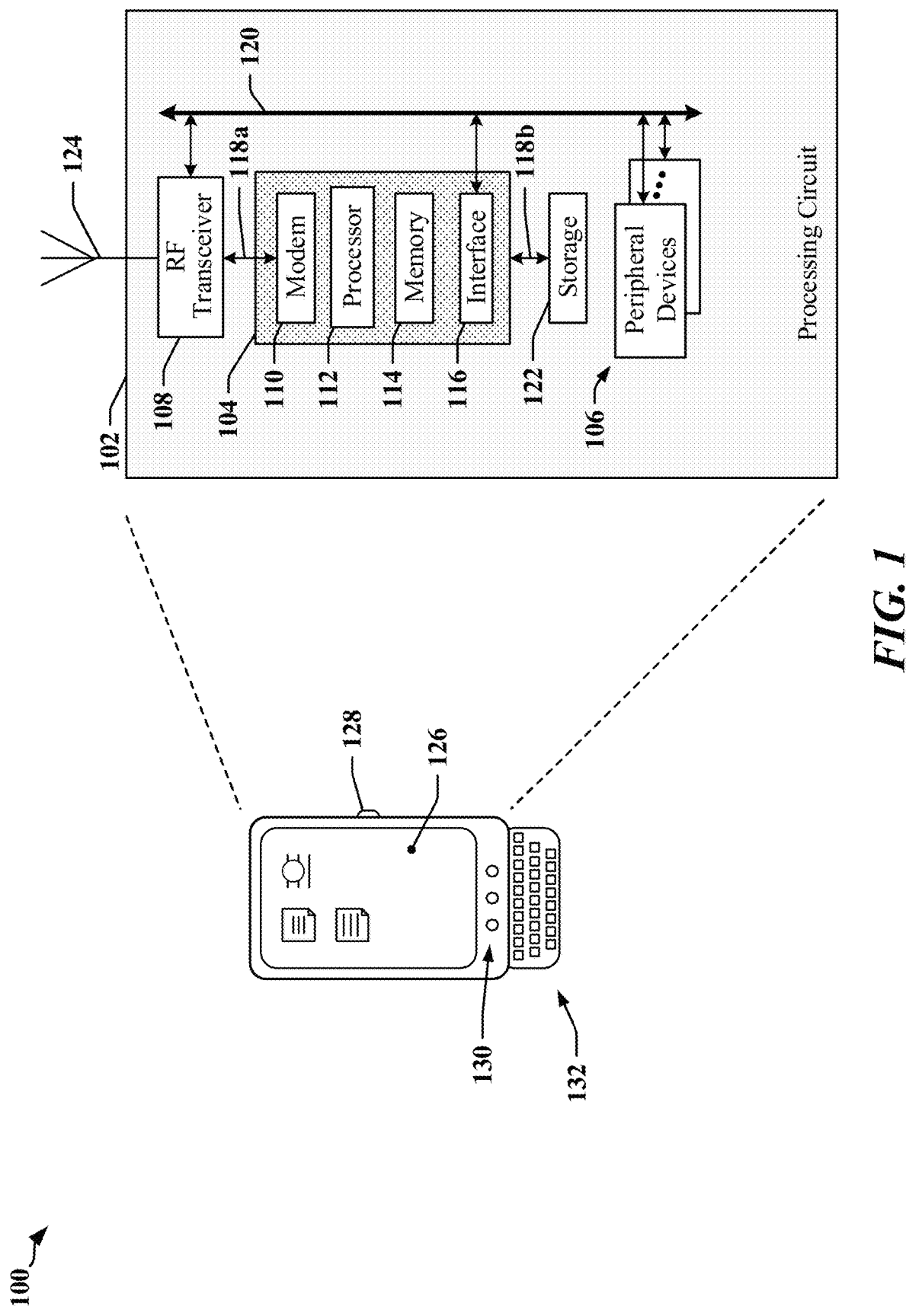
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or other protocol that may be configured for half-duplex operation. Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration and/or command transmissions specified by protocol.

High bus latency can limit the capabilities and functionality of a serial bus in certain applications. For example, bus latency may limit the number of radio frequency (RF) devices that can be coupled by an RFFE bus or SPMI bus. In some systems, multiple serial buses may be implemented to enable RF or other low-latency devices to communicate within tight time constraints, including where bus throughput, utilization and/or other operating characteristics are otherwise easily supported by a single bus. In some systems, a brute-force approach to reducing latency includes increasing transmission clock frequency. Increased clock frequencies are associated with increased power consumption within devices that are sensitive to battery life, and may cause increased electromagnetic interference.

In one aspect of this disclosure, the first plurality of bits from the double data rate data signal may be decoded by determining whether a transition in signaling state of the first wire occurred between two consecutively received bits, sampling the signaling state of the first wire to define the value of both consecutively received bits when no transition in signaling state of the first wire occurred, and defining values of both consecutively received bits based on direction of the transition when the transition in signaling state of the first wire occurred.

According to certain aspects disclosed herein, data may be encoded on both the data line and the clock line of the serial bus. In one example, a device coupled to the serial bus may decode a first plurality of bits from a double data rate data signal received from the data wire of the serial bus, and a second plurality of bits from a phase-encoded clock signal received from the clock wire of the serial bus. The first plurality of bits may be combined with the second plurality of bits to obtain at least two bytes of data.

In another example, a device coupled to the serial bus may encode primary data in a data signal to be transmitted over the data wire of the serial bus, and provide a phase-encoded clock signal to be transmitted over the clock wire of the serial bus. Secondary data may be encoded in direction of transition of the plurality of edges. An internal clock signal may be provided to control timing of communication over the serial bus. The data signal may be transmitted over the data wire of the serial bus such that one bit of data is transmitted for each clock cycle of the internal clock signal. The internal clock signal may be phase-encoded using the secondary data to generate the phase-encoded clock signal to be transmitted over the clock wire of the serial bus.

In another example, a device coupled to the serial bus may decode a first plurality of bits from a double data rate data signal received from the data wire of the serial bus, and a second plurality of bits from a phase-encoded clock signal received from the clock wire of the serial bus. The first plurality of bits may be combined with the second plurality of bits to obtain at least two bytes of data.

Certain aspects disclosed herein may be applicable to a serial bus operated in accordance with an I2C, I3C, SPMI, and/or RFFE protocol, or other protocol. Certain aspects are applicable to a serial bus operated in half-duplex mode or full-duplex mode. Certain aspects are applicable to point-to-point interfaces including UART-based interfaces, line multiplexed UART (LM-UART) interfaces, and virtual GPIO (VGI) and messaging interfaces. Certain aspects are applicable to multipoint interfaces and/or interfaces operated in point-to-point mode.

Examples of Apparatus that Employ Serial Data Links

According to certain aspects disclosed herein, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
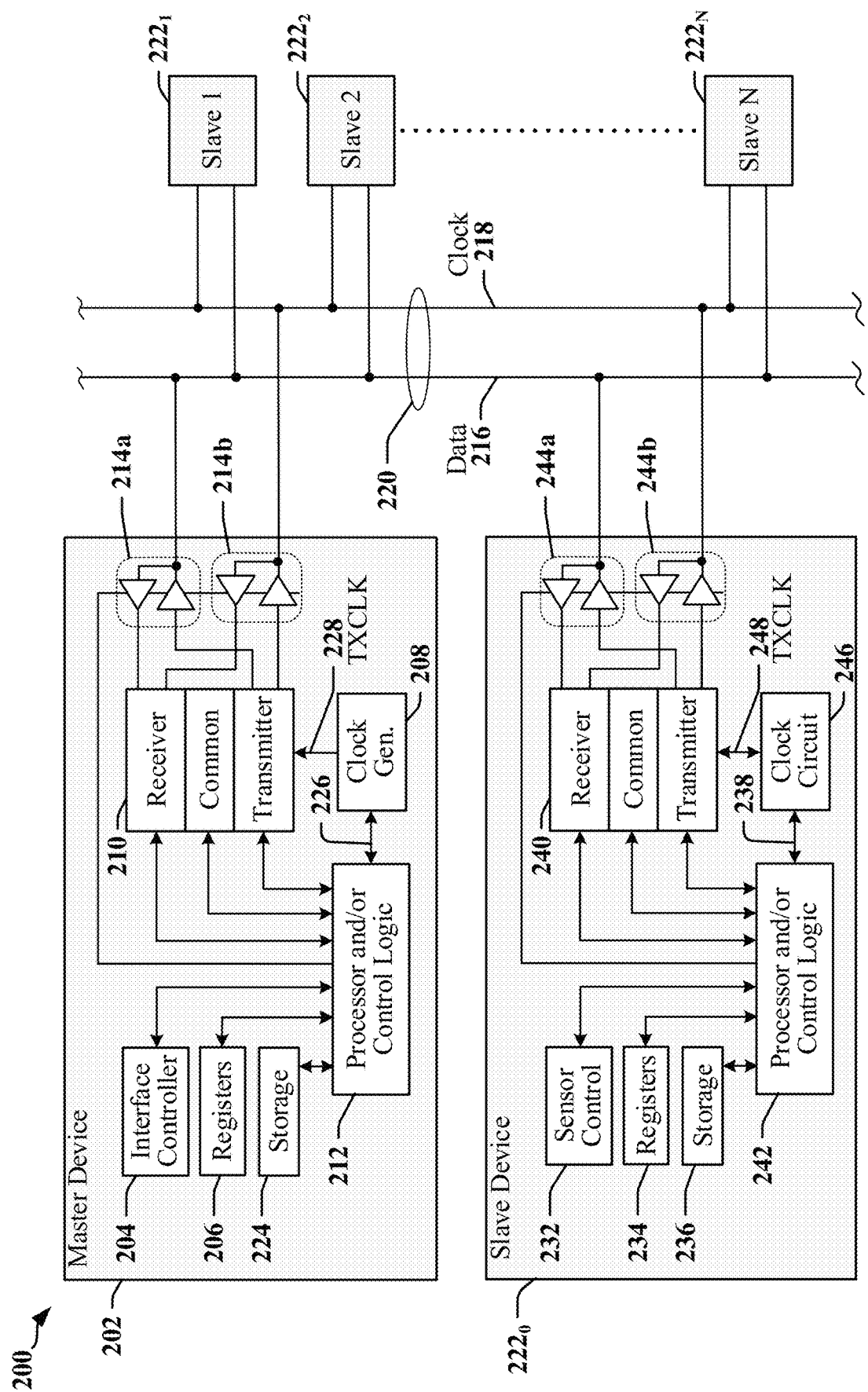
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a master device 202. Certain types of bus can support multiple master devices 202.

In one example, a master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one device 202, $222_0$-$222_N$ may be configured to operate as a master device and a slave device on the serial bus 220. Two or more devices 202, $222_0$-$222_N$ may be configured to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
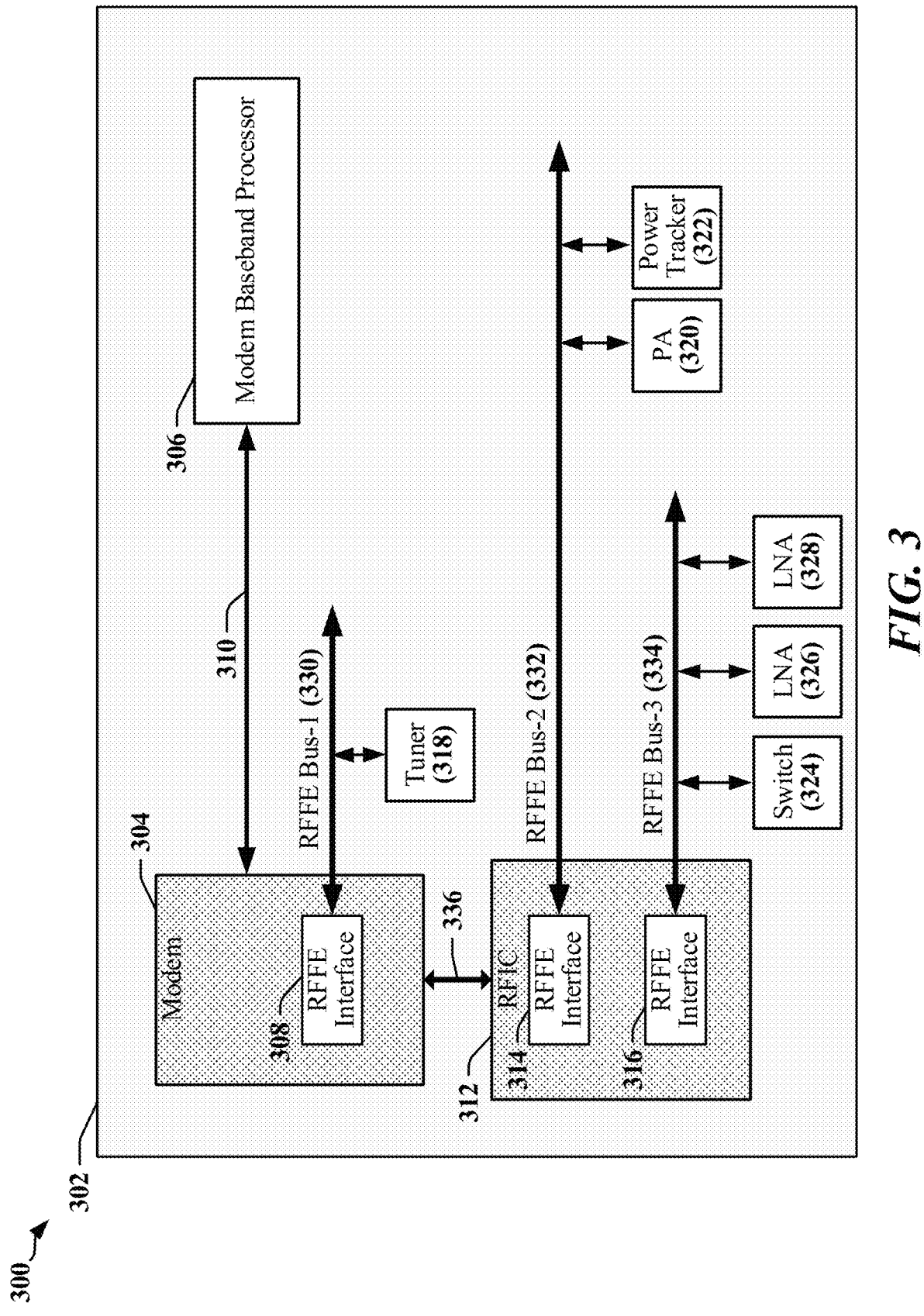
FIG. 3 illustrates a device configuration for coupling various radio frequency front-end devices using multiple RFFE buses.

FIG. 3 is a block diagram 300 illustrating a second example of a configuration of communication links in a chipset or device 302 that employs multiple RFFE buses 330, 332, 334 to couple various RF front-end devices 318, 320, 322, 324, 326 328. In this example, a modem 304 includes an RFFE interface 308 that couples the modem 304 to a first RFFE bus 330. The modem 304 may communicate with a baseband processor 306 and an RFIC 312 through one or more communication links 310, 336. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the device 302 may be implemented with one or more baseband processors 306, modems 304, RFICs 312, multiple communications links 310, 336, multiple RFFE buses 330, 332, 334 and/or other types of buses. The device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and the second RFFE bus 332. The RFIC 312 may communicate with a switch 324 and one or more LNAs 326, 328.

Figure 4:
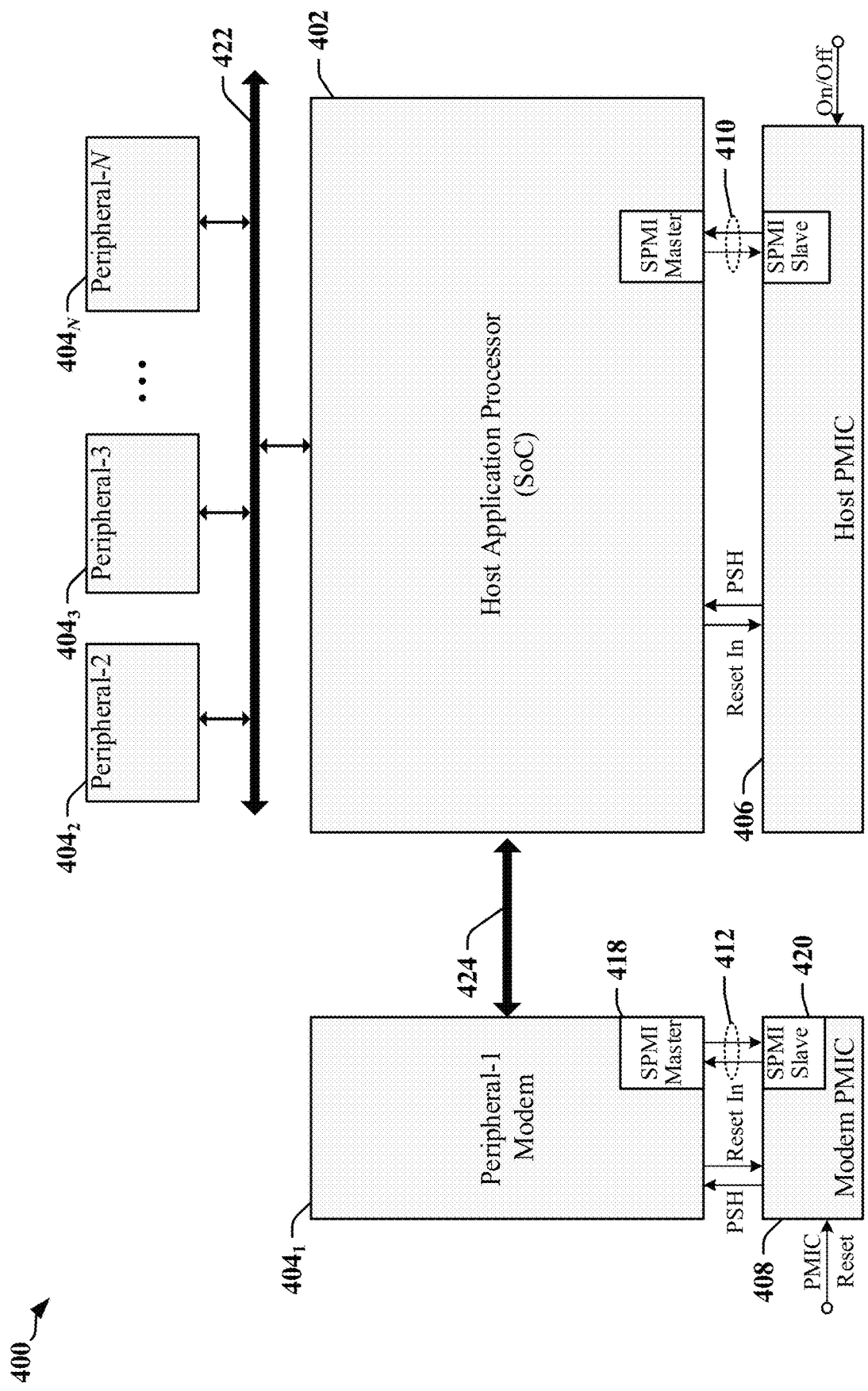
FIG. 4 illustrates a device that employs an SPMI bus to couple various devices in accordance with certain aspects disclosed herein.

The MIPI Alliance system power management interface (SPMI) specifies a hardware interface that may be implemented between baseband or application processors and peripheral components to support a variety of data communication functions including data communication related to power management operations. FIG. 4 illustrates an example of a system 400 which includes data communication links 410, 412, where each of the data communication links 410, 412 is configured as a two-wire serial bus operated in accordance with SPMI protocols. In one example, a first data communication link 410 may be used to connect an integrated power controller of an application processor 402 with a voltage regulation system in a first power management integrated circuit (PMIC 406), and a second data communication link 412 may be used to connect an integrated power controller of a modem $404_1$ with a voltage regulation system in a second PMIC 408. The data communication links 410, 412 can be used to accurately monitor and control processor performance levels required for a given workload or application and dynamically control the various supply voltages in real time based on the performance levels. The data communication links 410, 412 can be used to carry other types of data between the application processor 402 and the first PMIC 406 and/or between the modem $404_1$ and the second PMIC 408. SPMI data communication links may be implemented as multi-drop serial links to connect a variety of different devices and to carry other types of data. Some SPMI data communication links may be optimized for real-time power management functions. Some SPMI data communication links may be may be used as a shared bus that provides high-speed, low-latency connection for devices, where data transmissions may be managed, according to priorities assigned to different traffic classes.

In the system 400 illustrated in FIG. 4, the application processor 402 that may serve as a host device on various data communication links 410, 422, 424, multiple peripherals $404_1$-$404_N$, and one or more PMICs 406. The application processor 402 and the modem $404_1$ may be coupled to respective PMICs 406, 408 using power management interfaces implemented using SPMI masters 414, 418. The SPMI masters 414, 418 communicate with corresponding SPMI slaves 416, 420 provided in the PMICs 406, 408 to facilitate real-time control of the PMICs 406, 408. The application processor 402 may be coupled to each of the peripherals $404_1$-$404_N$ using different types of data communication links 410, 412. For example, the data communication links 410, 412 may be operated in accordance with protocols such as the RFFE, SPMI, I3C protocols.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a transaction in process on the serial bus, the time to transmit commands causing bus turnaround between transmit mode and receive mode, bus arbitration and/or command transmissions specified by protocol.

Bus latency may be reduced by increasing data throughput for the serial bus. In one example, data throughput may be increased by increasing the frequency of the clock signal transmitted on the clock line of the serial bus. In another example, data throughput may be increased by using double data rate (DDR) encoding whereby a bit of data is transmitted with each transition on the clock signal transmitted on the clock line of the serial bus.

Some devices and protocols may be unable to support higher clock frequencies or DDR encoding. For example, adoption of DDR encoding in RFFE interfaces can be challenging due to tight timing budget, particularly when clock signal frequencies are also increased. In many instances, system designers resort to the use of additional data interface lines to meet the higher throughput requirement, while keeping the data transmission scheme strictly SDR in nature. A countervailing design objective of interface pin reduction counter often results in an unfavorable compromise, which results in further challenges. For example, increased number of interface pins adds to package cost and complexity.

Certain aspects disclosed herein provide higher throughput using DDR encoding while permitting circuits and logic to operate within SDR timing limits and/or is resilient to tight timing budget that may arise when bus frequency is increased further.

Figure 5:
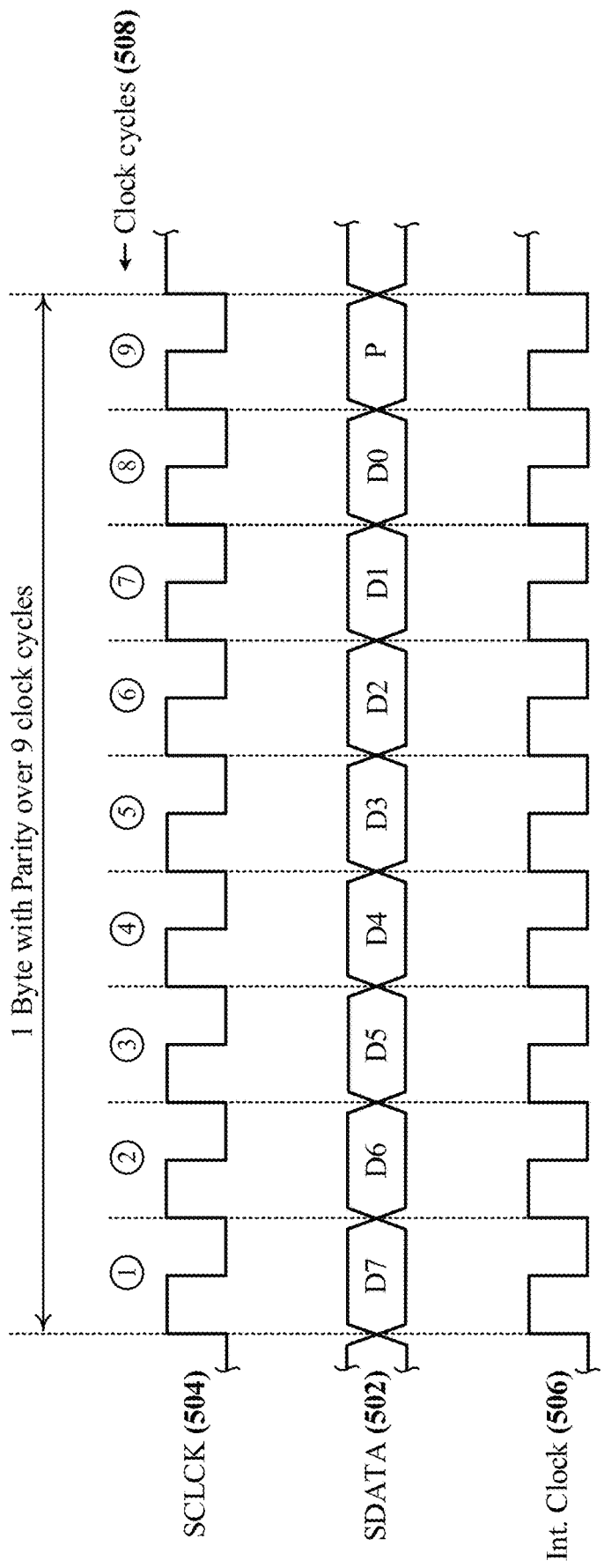
FIG. 5 illustrates certain aspects related to data communication over a serial bus operable in accordance with one or more protocols, including I2C, I3C, RFFE and SPMI protocols.

FIG. 5 is a timing diagram 500 illustrating certain aspects related to data communication over a serial bus operable in accordance with one or more protocols, including I2C, I3C, RFFE and SPMI protocols. The timing diagram 500 illustrates the relationship between a data signal (SDATA 502) transmitted on a first line of the serial bus in accordance with a clock signal (SCLCK 504) transmitted on a second line of the serial bus and an internal clock signal 506 used by a transmitter to generate SCLCK 504 or used by a receiver to capture bits from SDATA 502. The internal clock signal 506 may have any phase relationship with SCLCK 504. In one transmitter example, the internal clock signal 506 may have substantially no phase difference with respect to SCLCK 504, where differences may be attributable to circuit switching times. In one receiver example, the internal clock signal 506 may be 90° or 180° out of phase with respect to SCLCK 504 to provide a sampling edge at a point in each clock cycle 508 where SDATA 502 is stable. The example illustrated in FIG. 5 corresponds to a bus implementation that uses SDR encoding of data, or one bit per clock cycle 508.

Figure 6:
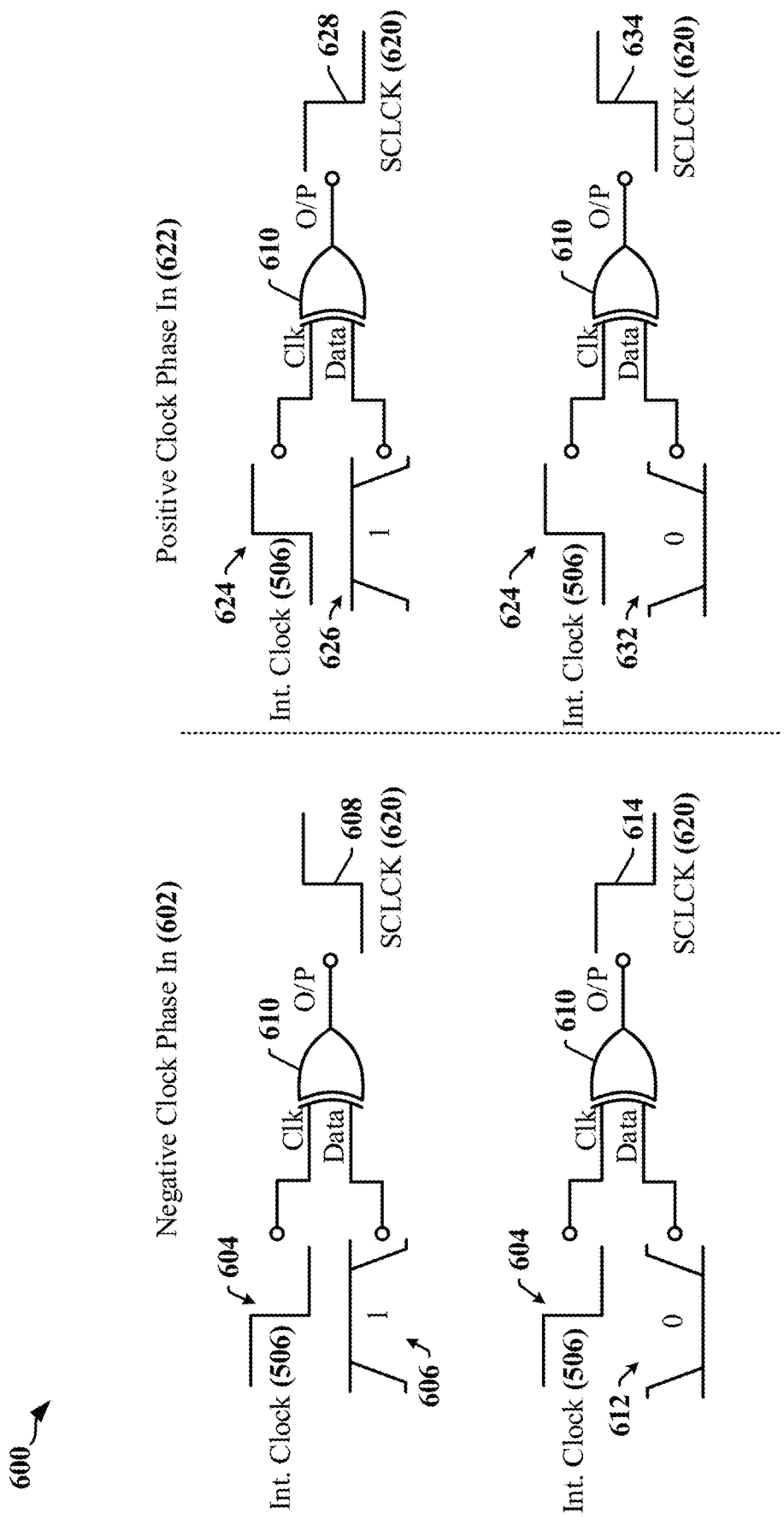
FIG. 6 illustrates aspects of a phase encoding scheme that may be used in accordance with certain aspects disclosed herein.

Certain aspects disclosed herein can increase data rate of the serial bus by phase-encoding the clock signal such that one additional bit of data is transmitted over the serial bus in each clock cycle. FIG. 6 illustrates aspects of a phase encoding scheme 600 that may be used in accordance with certain aspects disclosed herein. Phase encoding is accomplished in a transmitter using an Exclusive-Or gate 610 that gates the internal clock signal 506 with a secondary data signal to obtain a phase-encoded SCLK 620. Two sets of examples are illustrated.

The first examples 602 relate to data encoding during a negative-transitioning edge 604 in the internal clock signal 506. When a first data bit 606 has a value of binary 1, then the phase-encoded SCLK 620 reflects an inverted version of the internal clock signal 506. The phase-encoded SCLK 620 has a positive-transitioning edge 608 corresponding to the negative-transitioning edge 604 in the internal clock signal 506. When a second data bit 612 has a value of binary 0, then the internal clock signal 506 is passed through without inversion to the phase-encoded SCLK 620. The phase-encoded SCLK 620 has a negative-transitioning edge 614 corresponding to the negative-transitioning edge 604 in the internal clock signal 506.

The second examples 622 relate to data encoding during a positive-transitioning edge 624 in the internal clock signal 506. When a first data bit 626 has a value of binary 1, then the phase-encoded SCLK 620 reflects an inverted version of the internal clock signal 506. The phase-encoded SCLK 620 has a negative-transitioning edge 628 corresponding to the positive-transitioning edge 624 in the internal clock signal 506. When a second data bit 632 has a value of binary 0, then the internal clock signal 506 is passed through without inversion to the phase-encoded SCLK 620. The phase-encoded SCLK 620 has a positive-transitioning edge 634 corresponding to the positive-transitioning edge 624 in the internal clock signal 506.

Figure 7:
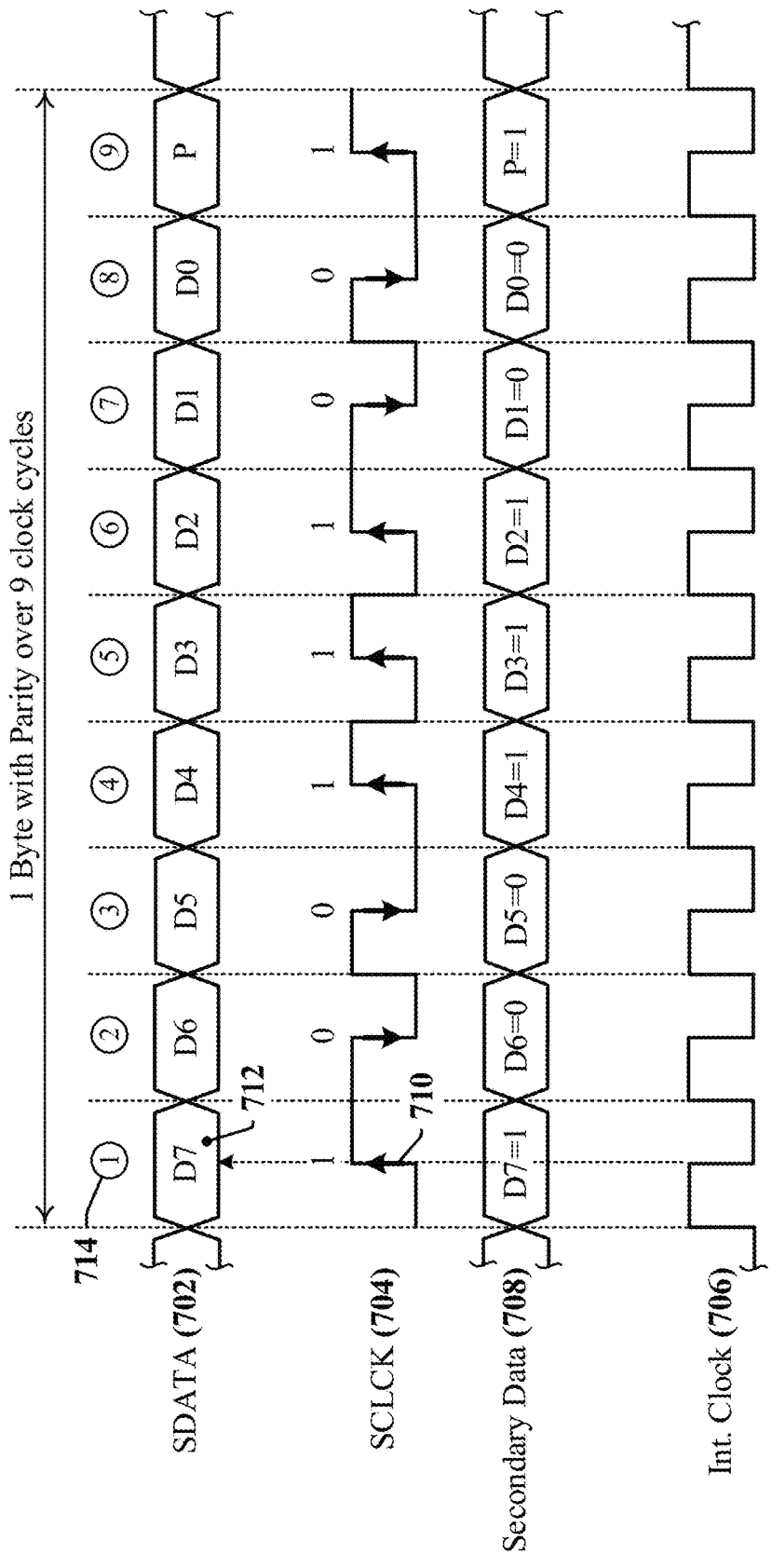
FIG. 7 illustrates a first example involving transmission of additional data over a serial bus in accordance with certain aspects disclosed herein.

FIG. 7 is a timing diagram 700 illustrating a first example involving transmission of additional data over a serial bus in accordance with certain aspects disclosed herein. The serial bus may be operable in accordance with one or more protocols, including I2C, I3C, RFFE and SPMI protocols. The timing diagram 700 illustrates the communication of primary data in a data signal (SDATA 702) transmitted on a first line of the serial bus in accordance with a clock signal (SCLCK 704) transmitted on a second line of the serial bus. An internal clock signal 706 is used by a transmitter to generate SCLCK 704. The timing diagram 700 relates to an example in which a secondary data signal 708 is used to phase-encode the internal clock signal 706 to provide SCLCK 704. Each bit of data carried in the secondary data signal 708 determines whether a clock cycle of the internal clock signal 706 is inverted in the corresponding clock cycle of SCLCK 704.

As illustrated, a 9-bit data payload is transmitted in 9 clock cycles, including 8 bits of data and one bit of parity. The concepts disclosed herein can be applied to other configurations of payloads. For example, other payload sizes and bit configurations may be transmitted according to a protocol governing the operation of the serial bus. For example, a data payload may include a 4-bit high priority message.

The example illustrated in FIG. 7 can double the amount of data that can be transmitted over a serial bus that uses SDR encoding of SDATA 702. Two bits can be transmitted per clock cycle.

After phase encoding, SCLCK 704 includes transitions that indicate when data bits may be captured from SDATA 702. For example, a positive-transitioning edge 710 in the first clock cycle 714 enables a receiver to capture bit D7 712 from SDATA 702. Sampling edges in a phase-encoded SCLCK 704 may transition from positive-to-negative or from negative-to-positive in any clock cycle. In some examples, the receiver may be adapted to recover a sampling clock signal corresponding to the internal clock signal 706. In other examples, the receiver may be adapted to sample SDATA 702 when an edge occurs at or near the center of a clock cycle, regardless of the direction of transition of the edge.

Data rates on a serial bus can be increased when DDR encoding is used on the data line. As described herein, certain devices and/or bus architectures may be unable to support DDR encoding. Certain aspects disclosed herein provide increased data rates through the use of DDR encoding coupled with vector DDR decoding at the receiver.

Figure 8:
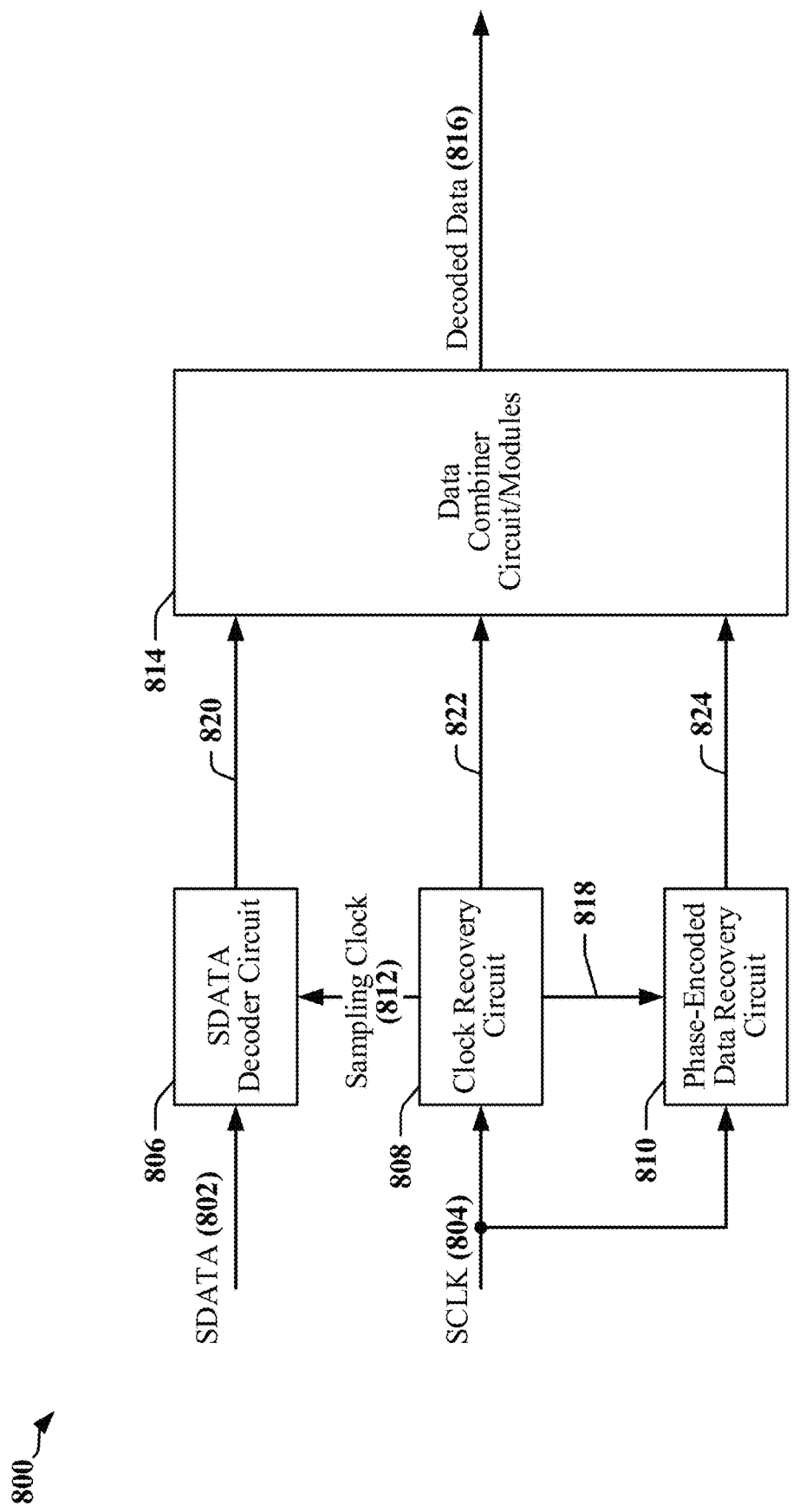
FIG. 8 illustrates a circuit in a receiver that can be used when a serial bus provides a phase-encoded clock signal on the serial bus in accordance with certain aspects disclosed herein.

FIG. 8 illustrates a circuit 800 in a receiver that can be used when a serial bus provides a phase-encoded clock signal (SCLK 804) on a first line of the serial bus in accordance with certain aspects disclosed herein. A clock recovery circuit 808 receives SCLK 804 and extracts a sampling clock signal 812 that may correspond to the internal clock signal 706 that was phase-encoded at the transmitter. In some instances, the clock recovery circuit 808 detects and reverses phase changes in SCLK 804 that occur at the transitions between bits in a data signal (SDATA 802) transmitted on a second line of the serial bus. The clock recovery circuit 808 provides the sampling clock signal 812 to an SDATA decoder circuit 806, a phase-encoded data recovery circuit 810 and a data combiner circuit 814. The SDATA decoder circuit 806 receives SDATA 802 and capture primary data from SDATA 806 using a sampling clock signal 812 provided by the clock recovery circuit 808. The SDATA decoder circuit 806 may be configured to capture SDR encoded data. The phase-encoded data recovery circuit 810 receives SCLK 804 and decodes secondary data from SCLK 804 using a clock signal 818 provided by the clock recovery circuit 808.

The data combiner circuit 814 receives captured data 820 from the SDATA decoder circuit 806 and decoded data 824 from the phase-encoded data recovery circuit 810. The data combiner circuit 814 may also receive one or more clock signal 822 that are used to align, order, interleave or otherwise combine data elements received from SDATA 806 and SCLK 804 to provide a decoded data output 816.

The clock signal may be encoded using other encoding techniques. In at least some examples, a clock signal may be encoded by concurrently applying multiple encoding techniques. One example of an encoding techniques is pulse-width modulation.

Figure 9:
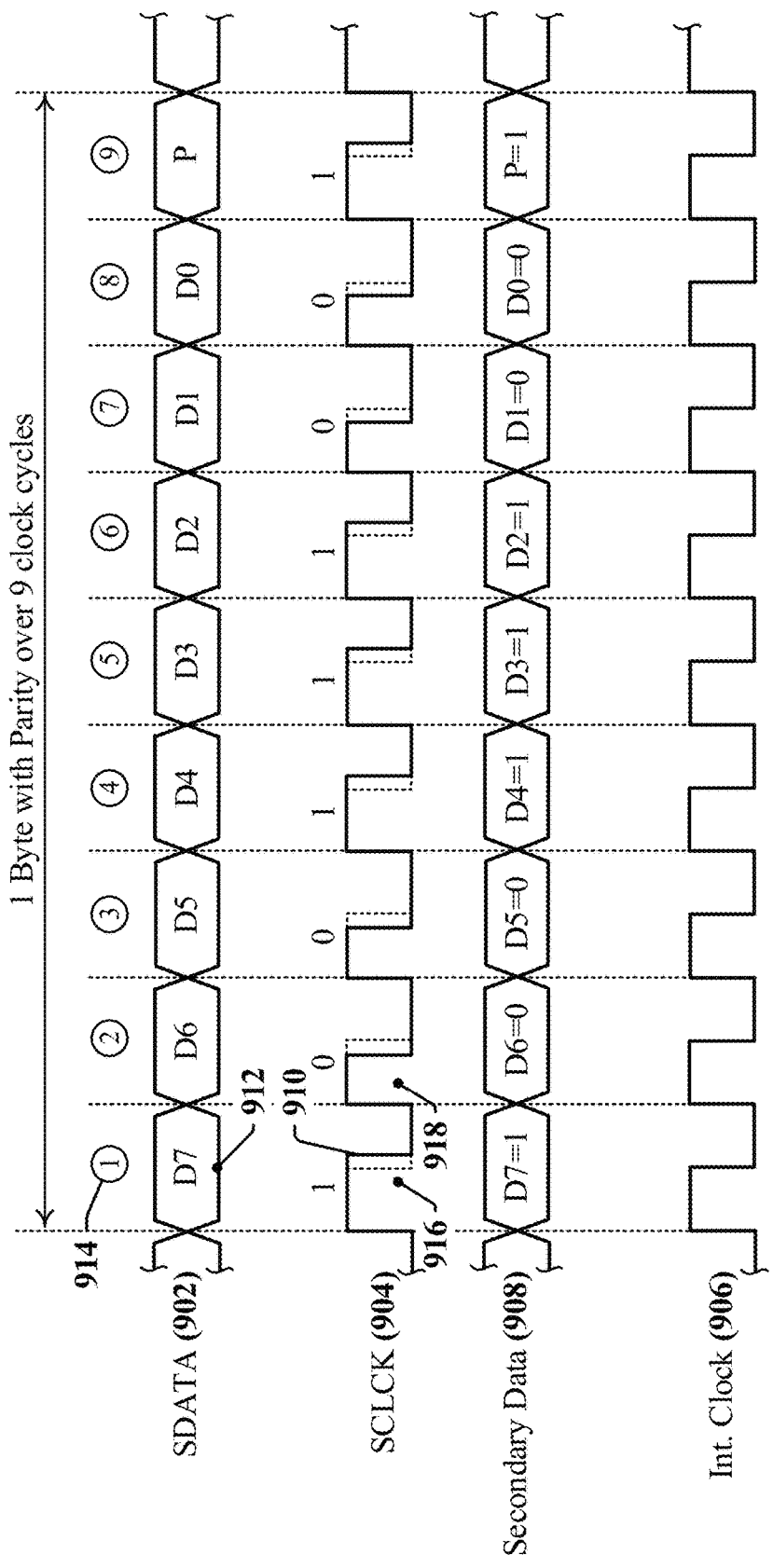
FIG. 9 is a timing diagram illustrating a second example involving transmission of additional data over a serial bus in accordance with certain aspects disclosed herein.

FIG. 9 is a timing diagram 900 illustrating a second example involving transmission of additional data over a serial bus using one example of pulse-width modulation in accordance with certain aspects disclosed herein. The serial bus may be operable in accordance with one or more protocols, including I2C, I3C, RFFE and SPMI protocols. The timing diagram 900 illustrates the communication of primary data in a data signal (SDATA 902) transmitted on a first line of the serial bus in accordance with a clock signal (SCLCK 904) transmitted on a second line of the serial bus. An internal clock signal 906 is used by a transmitter to generate SCLCK 904. The timing diagram 900 relates to an example in which a secondary data signal 908 is used to pulse-width modulate the internal clock signal 906 to provide SCLCK 904. Each bit of data carried in the secondary data signal 908 determines whether the duration of a pulse in each clock cycle of the internal clock signal 906 is extended or reduced in the corresponding clock cycle of SCLCK 904.

As illustrated, a 9-bit data payload is transmitted in 9 clock cycles, including 8 bits of data and one bit of parity. The concepts disclosed herein can be applied to other configurations of payloads. For example, other payload sizes and bit configurations may be transmitted according to a protocol governing the operation of the serial bus. For example, a data payload may include a 4-bit high priority message.

The example illustrated in FIG. 9 can double the amount of data that can be transmitted over a serial bus that uses SDR encoding of SDATA 902. Two bits can be transmitted per clock cycle.

After pulse-width modulation, SCLCK 904 includes pulses that indicate when data bits may be captured from SDATA 902. In one example, a positive-transitioning edge 910 in the first clock cycle 914 enables a receiver to capture bit D7 912 from SDATA 902. Sampling edges in a pulse-width modulated SCLCK 904 may be delayed or advanced in different clock cycles. In some examples, the receiver may be adapted to recover a sampling clock signal corresponding to the internal clock signal 906. In other examples, the receiver may be adapted to sample SDATA 902 when an edge occurs at or near the center of a clock cycle.

The width of pulses 916, 918 in SDATA 902 encodes the additional data. For example, a longer pulse 916 may encode a binary 1 value while a shorter pulse 918 encodes a binary 0 value. Of course, in some implementations, longer pulses may encode binary 0 values while shorter pulses encode binary 1 values.

The examples illustrated in FIGS. 6-9 may correspond closely to a system that includes a serial bus operable in accordance with one or more protocols, including I2C, I3C, RFFE and SPMI protocols. These examples are provided to facilitate description of certain underlying concepts. These and other concepts may be equally applicable to systems that employ or rely on other types of communication interfaces and/or other serial buses operable in accordance with another protocol. In one example, a serial bus may be operated in half-duplex mode or full-duplex mode. Other communication interfaces may include point-to-point interfaces such as UART-based interfaces, LM-UART interfaces, and VGI and messaging interfaces. Certain concepts disclosed herein are applicable to multipoint interfaces and/or interfaces operated in point-to-point mode.

Vector Decoding

Figure 10:
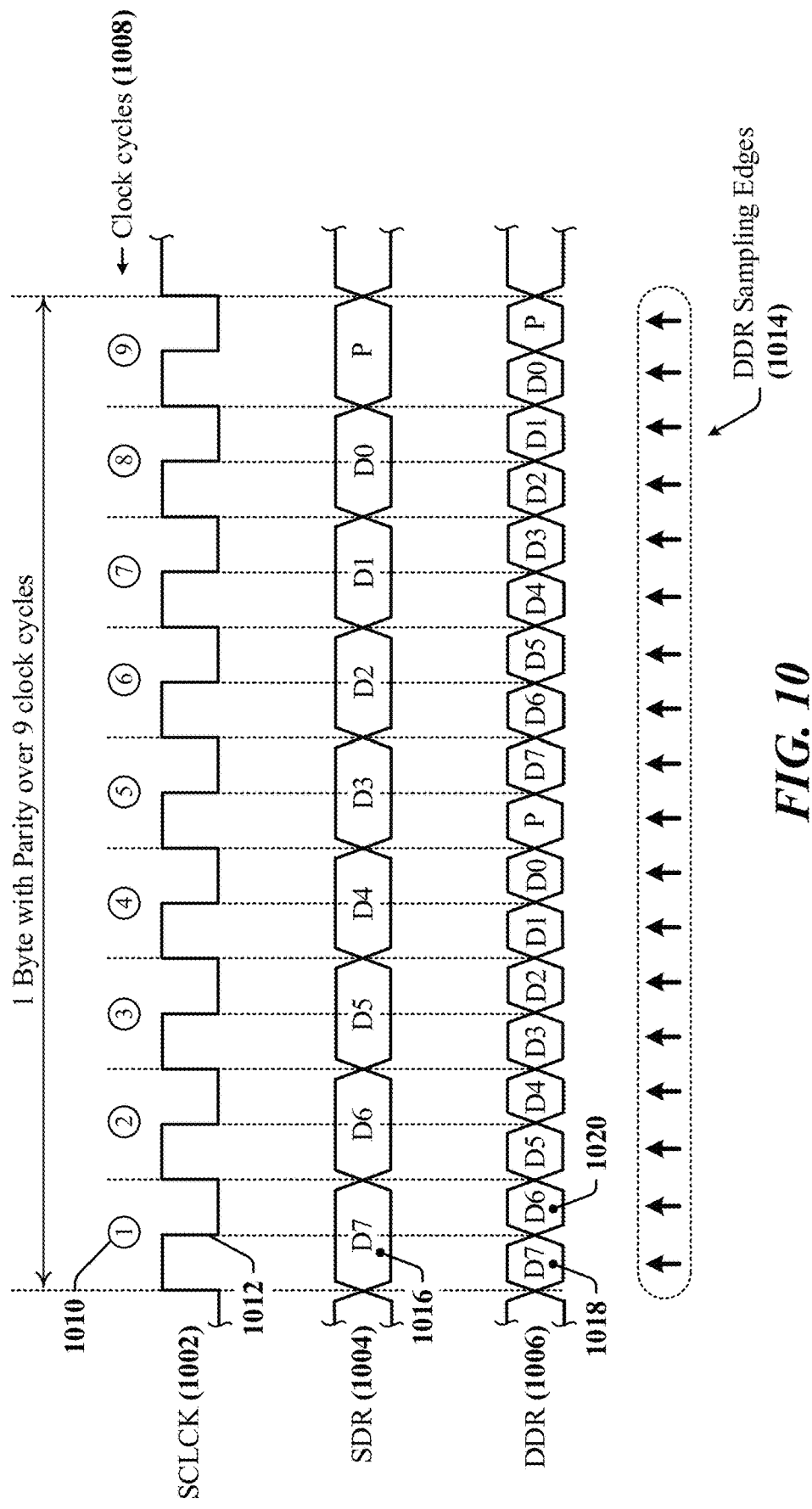
FIG. 10 illustrates communication over a serial bus using DDR encoding in accordance with certain aspects disclosed herein.

FIG. 10 is a timing diagram 1000 illustrating certain aspects related to communication over a serial bus using DDR encoding. The timing diagram 1000 illustrates the relationship between a first data signal (SDR 1004) that may be transmitted on a first line of the serial bus in accordance with a clock signal (SCLCK 1002) transmitted on a second line of the serial bus and a second data signal (DDR 1006) that may be transmitted on the first line of the serial bus in accordance with SCLCK 1002.

The illustrated examples relate to a transmission over 9 clock cycles 1008. In a first example, SDR 1004 carries encoded data in which each bit is transmitted during a full cycle of SCLCK 1002. For example, the D7 bit 1016 is transmitted during the first clock cycle 1010, and may be captured using the falling edge 1012 of SCLCK 1002. In a second example, DDR 1006 carries encoded data in which each bit is transmitted during a half-cycle of SCLCK 1002. For example, the D7 bit 1018 and the D6 bit 1020 are both transmitted during the first clock cycle 1010. The DDR bits 1018, 1020 may be captured using edges 1014 in a DDR sampling clock signal, where the edges 1014 may correspond to the edges in a phase shifted version of SCLCK 1002. In some implementations, the frequency of SCLCK 1002 and/or the characteristics of line drivers and receivers can reduce the window of time during which DDR bits 1018, 1020 can be captured and may inhibit the use of DDR encoding in some implementations.

Figure 11:
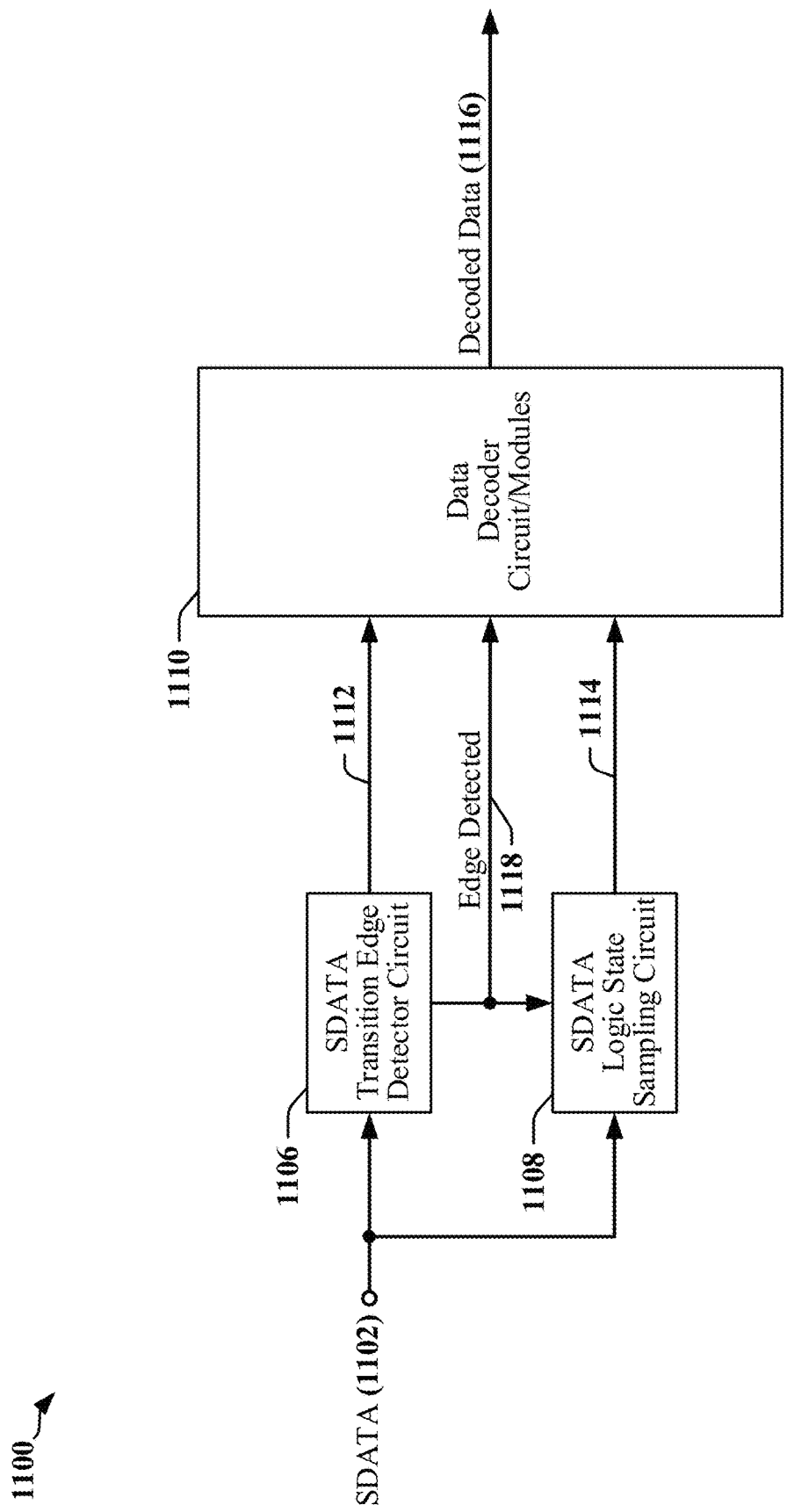
FIG. 11 illustrates a vector-DDR decoding circuit that may be used in time-constrained DDR interfaces in accordance with certain aspects disclosed herein.

FIG. 11 illustrates a vector-DDR decoding circuit 1100 that may be used in time-constrained DDR interfaces, including interfaces intended for SDR use. Vector-DDR decoding may permit circuits and logic to operate within SDR timing limits and/or be resilient to tight timing budget that may arise when bus frequency is increased further.

The vector-DDR decoding circuit 1100 includes an SDATA Transition-Edge detector circuit 1106 coupled to SDATA 1102. When enabled and/or active the SDATA Transition-Edge detector circuit 1106 detects transitions on SDATA 1102 during the SDATA sampling window, which may be defined for SDR transmissions.

The vector-DDR decoding circuit 1100 further includes an SDATA Logic State sampling circuit 1108 which samples the logic state of SDATA 1102 during the sampling window when enabled and/or active. In certain examples, the SDATA Logic State sampling circuit 1108 may respond to an edge detection signal 1118 provided by the SDATA Transition-Edge detector circuit 1106. The edge detection signal 1118 may indicate that no edge has been detected in the current pair of consecutive bits and the SDATA Logic State sampling circuit 1108 may respond by sampling the signaling state of SDATA 1102. The edge detection signal 1118 may indicate that an edge has been detected in the current pair of consecutive bits and, in some examples, the SDATA Logic State sampling circuit 1108 may respond by suppressing sampling of SDATA 1102.

The vector-DDR decoding circuit 1100 further includes a data decoder circuit 1110 that decodes data from output signals 1112, 1114 received from the SDATA Transition-Edge detector circuit 1106 and the SDATA Logic State sampling circuit 1108, respectively. In various examples, the data decoder circuit 1110 determines whether the SDATA Transition-Edge detector circuit 1106 has detected an edge during the sampling window. For example, the data decoder circuit 1110 may respond to an edge detection signal 1118 provided by the SDATA Transition-Edge detector circuit 1106 whether a transition has been detected between the bits of the current pair of consecutive bits received from SDATA 1102. When a transition has occurred, the data decoder circuit 1110 may use the direction of transition in the edge (as indicated by the SDATA Transition-Edge detector circuit 1106) to decode the two bits of data transmitted during the current clock cycle. When no transition has occurred, the data decoder circuit 1110 may use the logic state of SDATA 1102 as indicated by the SDATA Logic State sampling circuit 1108 to define the two bits of data transmitted during the current clock cycle. The data decoder circuit 1110 provides a stream of decoded bits 1116 for deserialization.

In some implementations, the vector-DDR decoding circuit 1100 may account for line inversion mode of SDATA 1102. The line inversion mode of SDATA 1102 may determine whether data bits are transmitted in like-state on SDATA 1102, or in an inverted state on SDATA 1102. For example, a high voltage state on SDATA 1102 represents a logic 1 transmitted bit-value while a low voltage state on SDATA 1102 represents a logic 0 transmitted bit-value in some implementations. In other examples, a high voltage state on SDATA 1102 represents a logic 0 transmitted bit-value while a low voltage state on SDATA 1102 represents a logic 1 transmitted bit-value in some implementations. According to certain aspects, the vector-DDR decoding circuit 1100 may be configured with information indicating the line inversion mode of SDATA 1102.

Figure 12:
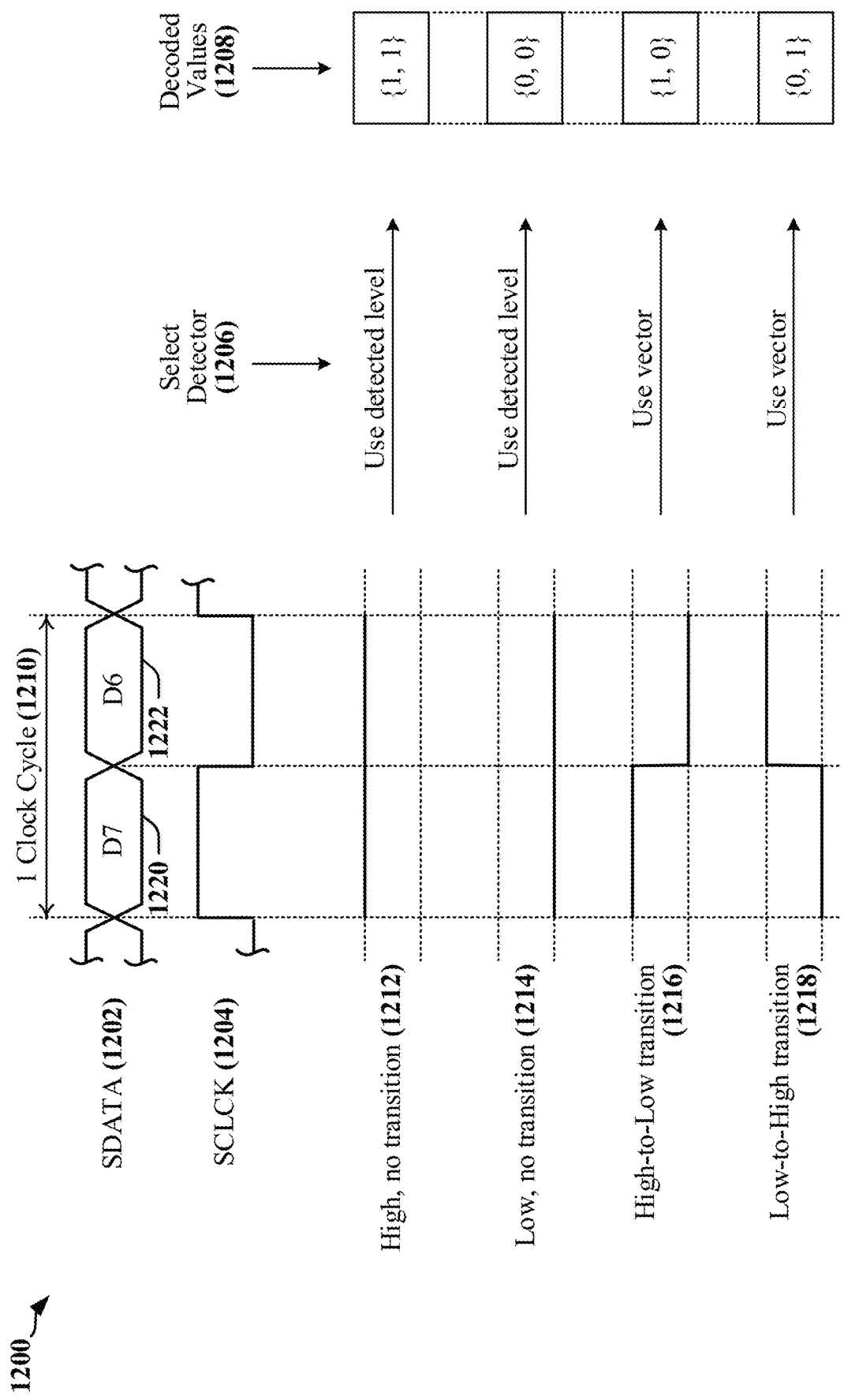
FIG. 12 illustrates an example of operation of the vector-DDR decoding circuit illustrated in FIG. 11.

FIG. 12 illustrates an example of vector-DDR decoding 1200 that may be employed in accordance with certain aspects disclosed herein. Vector-DDR decoding 1200 may be employed when setup, hold and/or other ratings for receiver circuit components cannot be satisfied when DDR is implemented. The vector-DDR decoding circuit 1100 has the SDATA Transition-Edge detector circuit 1106 and the SDATA Logic State sampling circuit 1108, where the SDATA Logic State sampling circuit 1108 can be used when no transition occurs between two sequentially transmitted DDR bits, and the SDATA Transition-Edge detector circuit 1106 may be used when a transition occurs between the two sequentially transmitted DDR bits. FIG. 12 illustrates a clock cycle 1210 of SCLCK 1204 when DDR encoded data is transmitted on SDATA 1202. Two data bits 1220, 1222 are transmitted during the clock cycle 1210 and an analysis of the processing of the four possible cases 1212, 1214, 1216, 1218 is provided. The analysis indicates 1206 whether the SDATA Transition-Edge detector circuit 1106 or the SDATA Logic State sampling circuit 1108 detector is selected to capture the two data bits 1220, 1222 and the data decoder circuit 1110 provides the captured and/or decoded values 1208 as defined for the appropriate possible cases 1212, 1214, 1216, 1218.

In the first case 1212, SDATA 1202 is high during the full clock cycle 1210 and the SDATA Logic State sampling circuit 1108 can be used. In one example, the SDATA Transition-Edge detector circuit 1106 indicates that no transition occurred and the value captured by the SDATA Logic State sampling circuit 1108 can used as the value of both data bits 1220, 1222. In some instances, data values may be inverted on SDATA 1202 and the vector-DDR decoding circuit 1100 may invert decoded values accordingly. The vector-DDR decoding circuit 1100 operates for each pair of sequentially transmitted bits, including bits transmitted in half-cycles of different clock cycles.

In the second case 1214, SDATA 1202 is low during the full clock cycle 1210 and the SDATA Logic State sampling circuit 1108 can be used. In one example, the SDATA Transition-Edge detector circuit 1106 indicates that no transition occurred and that the value captured by the SDATA Logic State sampling circuit 1108 can used as the value of both data bits 1220, 1222. In some instances, data values may be inverted on SDATA 1202 and the vector-DDR decoding circuit 1100 may invert decoded values accordingly. The vector-DDR decoding circuit 1100 operates for each pair of sequentially transmitted bits, including bits transmitted in half-cycles of different clock cycles.

In the third case 1216, SDATA 1202 transitions during the clock cycle 1210 and the SDATA Transition-Edge detector circuit 1106 is used to decode the data bits 1220, 1222. The SDATA Transition-Edge detector circuit 1106 indicates that a transition has occurred and identifies the direction of the transition. Here, the transition is high to low indicating that the first bit 1220 has a binary value of '1' and that the second bit 1222 has a binary value of '0'. In some instances, data values may be inverted on SDATA 1202 and the vector-DDR decoding circuit 1100 may invert decoded values accordingly. The vector-DDR decoding circuit 1100 operates for each pair of sequentially transmitted bits, including bits transmitted in half-cycles of different clock cycles.

In the fourth case 1218, SDATA 1202 transitions during the clock cycle 1210 and the SDATA Transition-Edge detector circuit 1106 is used to decode the data bits 1220, 1222. The SDATA Transition-Edge detector circuit 1106 indicates that a transition has occurred and identifies the direction of the transition. Here, the transition is low to high indicating that the first bit 1220 has a binary value of '0' and that the second bit 1222 has a binary value of '1'. In some instances, data values may be inverted on SDATA 1202 and the vector-DDR decoding circuit 1100 may invert decoded values accordingly. The vector-DDR decoding circuit 1100 operates for each pair of sequentially transmitted bits, including bits transmitted in half-cycles of different clock cycles.

Certain aspects disclosed herein can increase data rate of the serial bus by transmitting DDR-encoded data and phase-encoding the clock signal such that two additional bits of data are transmitted over the serial bus in each clock cycle.

Figure 13:
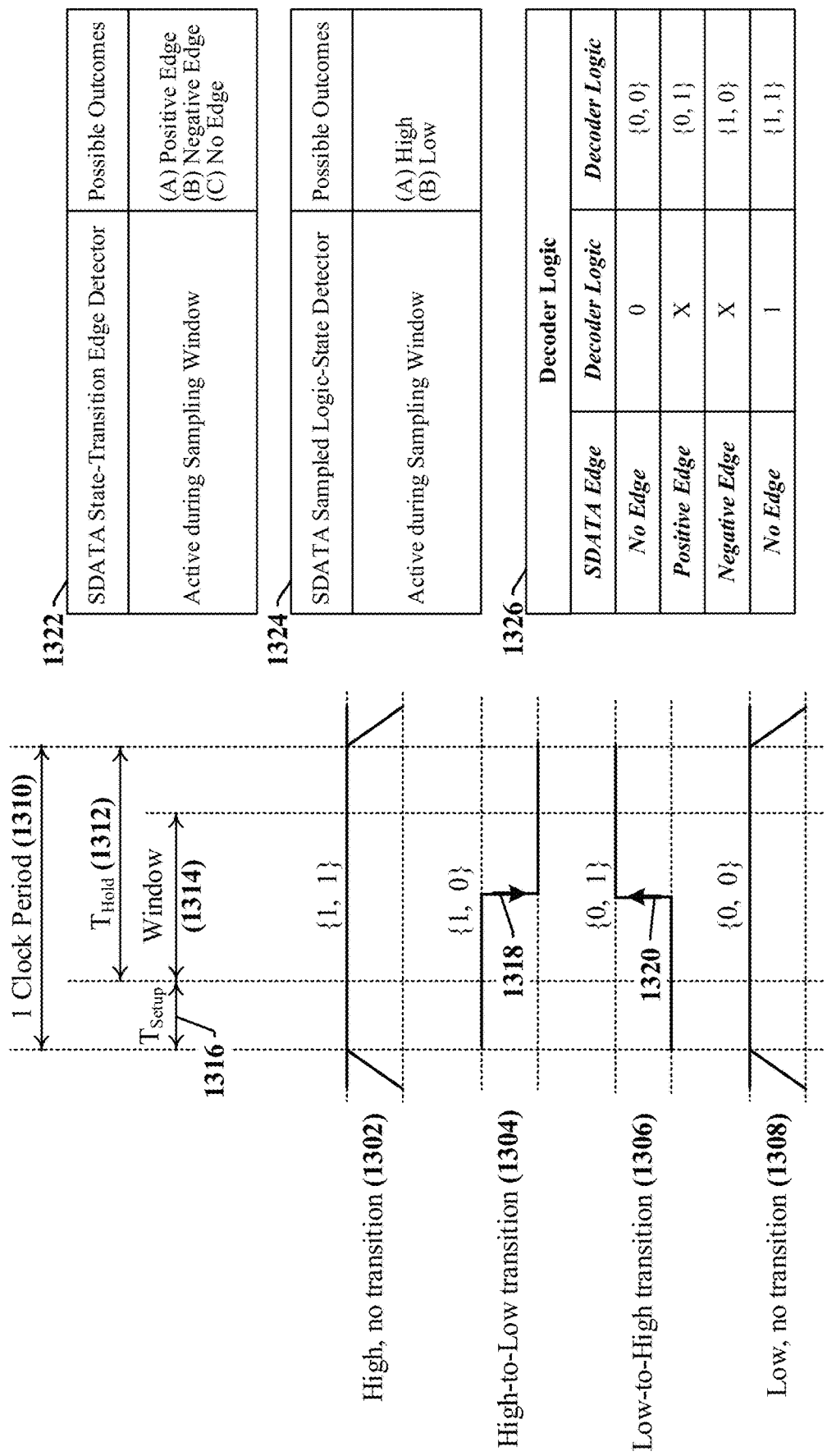
FIG. 13 illustrates an example of signaling and timing constraints for a first example of vector-DDR decoding in accordance with certain aspects disclosed herein.

FIG. 13 illustrates an example of signaling and timing constraints for a first example of vector-DDR decoding 1300 in accordance with certain aspects disclosed herein that may be employed when SDATA 1202 polarity inversion is not enabled. Each cycle of the clock signal transmitted on SCLCK 1204 has a period 1310 (duration T). The timing constraints defined for SDATA 1202 may be defined by specifications for SDR transmissions and may be difficult to meet in DDR transmission. For example, a combination of setup time ($T_{Setup}$ 1316) and hold time ($T_{Hold}$ 1312) may provide a sampling window 1314 of sufficient duration for SDR decoding purposes, but can often prevent a receiver for capturing two DDR bits during conventional DDR decoding.

According to certain aspects disclosed herein, $T_{Setup}$ 1316 and $T_{Hold}$ 1312 defined for SDR transmissions can be satisfied when no transition occurs between two DDR bit intervals. Two such examples 1302, 1308 are provided in FIG. 13. In these examples, the timing of the two consecutively-transmitted same-value DDR bits is equivalent to the timing of a single SDR bit. Accordingly, the SDATA Logic State sampling circuit 1108 can capture the value of SDATA 1202 and the data decoder circuit 1110 can define both DDR bits as having the captured value.

$T_{Setup}$ 1316 and $T_{Hold}$ 1312 defined for SDR transmissions may not be satisfied when a transition occurs between two DDR bit intervals such that the two bits have two different values. In the two examples 1304, 1306 of different-valued DDR bits provided in FIG. 13, the SDATA Transition-Edge detector circuit 1106 identifies the presence and direction of a transition 1318, 1320. The data decoder circuit 1110 can define both DDR bits based on the direction of the transition 1318, 1320.

FIG. 13 includes tables 1322, 1324 describing the operation SDATA Logic State sampling circuit 1108 and the SDATA Transition-Edge detector circuit 1106, respectively. FIG. 13 also includes a table 1326 describing the operation of the data decoder circuit 1110 when polarity of SDATA 1102 is not inverted.

Figure 14:
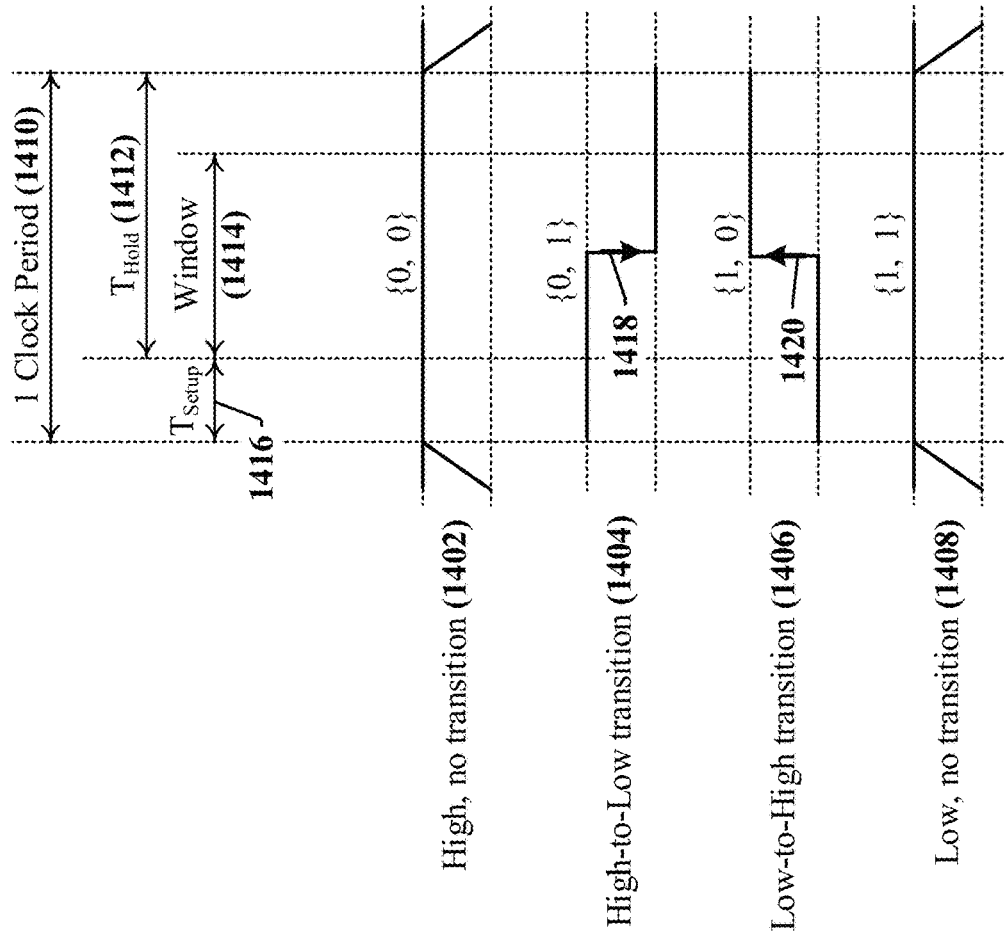
FIG. 14 illustrates an example of signaling and timing constraints for a second example of vector-DDR decoding in accordance with certain aspects disclosed herein.

FIG. 14 illustrates an example of signaling and timing constraints for a second example of vector-DDR decoding 1400 in accordance with certain aspects disclosed herein that may be employed when SDATA polarity inversion is not enabled. Each cycle of the clock signal transmitted on SCLCK 1204 has a period 1410 (duration T). The timing constraints defined for SDATA 1202 may be defined by specifications for SDR transmissions and may be difficult to meet in DDR transmission. For example, a combination of setup time ($T_{Setup}$ 1416) and hold time ($T_{Hold}$ 1412) may provide a sampling window 1414 of sufficient duration for SDR decoding purposes, but can often prevent a receiver for capturing two DDR bits during conventional DDR decoding.

According to certain aspects disclosed herein, $T_{Setup}$ 1416 and $T_{Hold}$ 1412 defined for SDR transmissions can be satisfied when no transition occurs between two DDR bit intervals. Two such examples 1402, 1408 are provided in FIG. 14. In these examples, the timing of the two consecutively-transmitted same-value DDR bits is equivalent to the timing of a single SDR bit. Accordingly, the SDATA Logic State sampling circuit 1108 can capture the value of SDATA 1202 and the data decoder circuit 1110 can define both DDR bits as having the captured value.

$T_{Setup}$ 1416 and $T_{Hold}$ 1412 defined for SDR transmissions may not be satisfied when a transition occurs between two DDR bit intervals such that the two bits have two different values. In the two examples 1404, 1406 of different-valued DDR bits provided in FIG. 14, the SDATA Transition-Edge detector circuit 1106 identifies the presence and direction of a transition 1418, 1420. The data decoder circuit 1110 can define both DDR bits based on the direction of the transition 1418, 1420.

FIG. 14 includes tables 1422, 1424 describing the operation SDATA Logic State sampling circuit 1108 and the SDATA Transition-Edge detector circuit 1106, respectively. FIG. 14 also includes a table 1426 describing the operation of the data decoder circuit 1110 when SDATA 1202 polarity is inverted.

Throughput Tripling Using Vector-DDR and Phase Encoding

Figure 15:
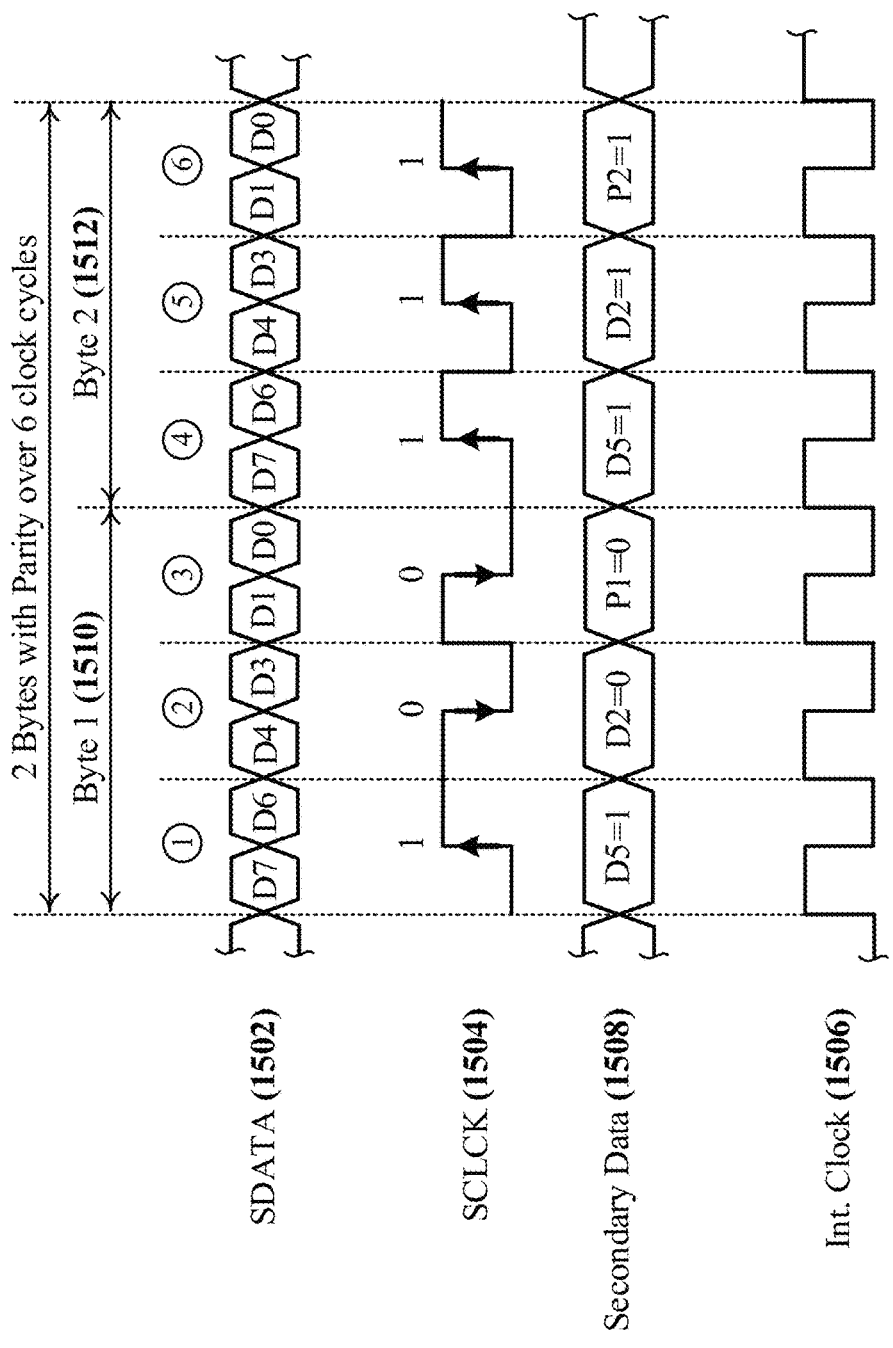
FIG. 15 illustrates a second example involving transmission of additional data over a serial bus in accordance with certain aspects disclosed herein.

FIG. 15 is a timing diagram 1500 illustrating a second example involving transmission of additional data over a serial bus in accordance with certain aspects disclosed herein. The serial bus may be operable in accordance with one or more protocols, including I2C, I3C, RFFE and SPMI protocols. The timing diagram 1500 illustrates the communication of primary data in a DDR data signal transmitted on a first line (SDATA 1502) of the serial bus in accordance with a clock signal transmitted on a second line (SCLCK 1504) of the serial bus. An internal clock signal 1506 is used by a transmitter to generate the clock signal transmitted on SCLCK 1504. The timing diagram 1500 relates to an example in which a secondary data signal 1508 is used to phase-encode the internal clock signal 1506 to provide the clock signal transmitted on SCLCK 1504. Each bit of data carried in the secondary data signal 1508 determines whether a clock cycle of the internal clock signal 1506 is inverted in the corresponding clock cycle of the clock signal transmitted on SCLCK 1504.

As illustrated, an 18-bit data payload is transmitted in 6 clock cycles, including two bytes 1510, 1512 totaling 16 bits of data and two bits of parity. The bits of each byte 1510, 1512 are transmitted as DDR bits on SDATA 1502 and as phase-encoded bits on SCLCK 1504. The first byte 1510 is completely transmitted before the second byte 1512 is transmitted. Accordingly, the bytes 1510, 1512 are independently transmitted, and a transmission error affecting one byte 1510, 1512 does not affect transmission of the second byte 1512, 1510.

The concepts disclosed herein can be applied to other configurations of payloads and bytes. For example, other payload sizes and bit configurations may be transmitted according to a protocol governing the operation of the serial bus. The example illustrated in FIG. 15 can triple the amount of data that can be transmitted over a serial bus that uses SDR encoding of a data signal transmitted on SDATA 1502. In the example illustrated in FIG. 15, three bits can be transmitted per clock cycle.

Figure 16:
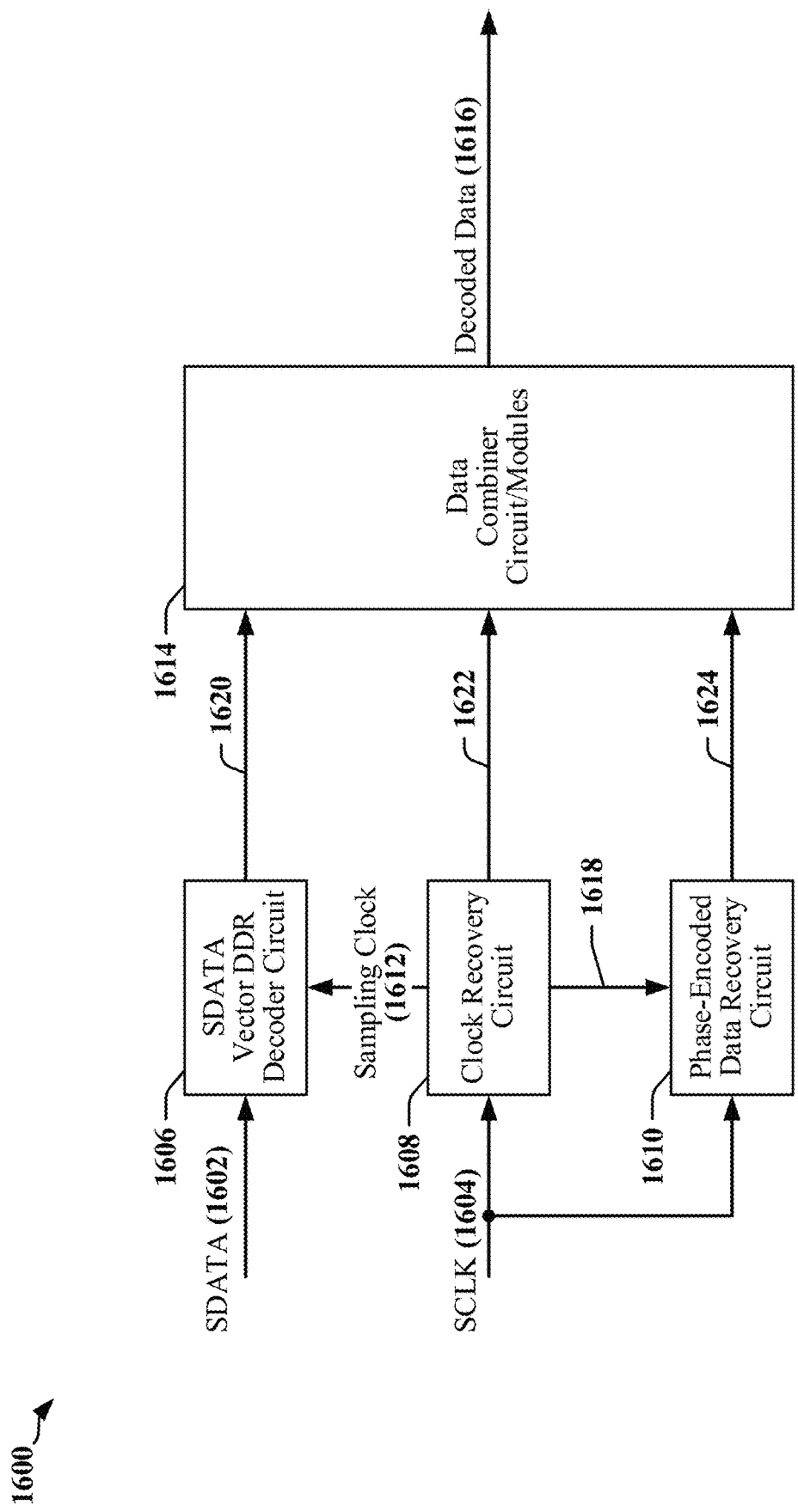
FIG. 16 illustrates a circuit in a receiver that can be used when a serial bus provides a phase-encoded clock signal and DDR-encoded data in a data signal in accordance with certain aspects disclosed herein.

FIG. 16 illustrates a circuit 1600 in a receiver that can be used when a serial bus provides a phase-encoded clock signal on a first line (SCLK 1604) of the serial bus and DDR-encoded data in a data signal transmitted on a second line (SDATA 1602) of the serial bus in accordance with certain aspects disclosed herein. A clock recovery circuit 1608 receives SCLK 1604 and extracts a sampling clock signal 1612 that may correspond to an internal clock signal that was phase-encoded at the transmitter. In some instances, the clock recovery circuit 1608 detects and reverses phase changes in SCLK 1604 that occur at the transitions between bits in the data signal transmitted on SDATA 1602. The clock recovery circuit 1608 provides the sampling clock signal 1612 to an SDATA vector-DDR decoder circuit 1606, a phase-encoded data recovery circuit 1610 and a data combiner circuit 1614. The SDATA vector-DDR decoder circuit 1606 receives the data signal from SDATA 1602 and captures data from the data signal using a level detection circuit and a vector detection circuit that receives timing information from a sampling clock signal 1612 provided by the clock recovery circuit 1608. The SDATA vector-DDR decoder circuit 1606 may be configured to capture DDR encoded data. The phase-encoded data recovery circuit 1610 receives SCLK 1604 and decodes data from SCLK 1604 using a clock signal 1618 provided by the clock recovery circuit 1608.

The data combiner circuit 1614 receives captured data 1620 from the SDATA vector-DDR decoder circuit 1606 and decoded data 1624 from the phase-encoded data recovery circuit 1610. The data combiner circuit 1614 may also receive one or more clock signal 1622 that are used to align, order, interleave or otherwise combine data elements received from SDATA 1606 and SCLK 1604 to provide a decoded data output 1616.

Examples of Processing Circuits and Methods

Figure 17:
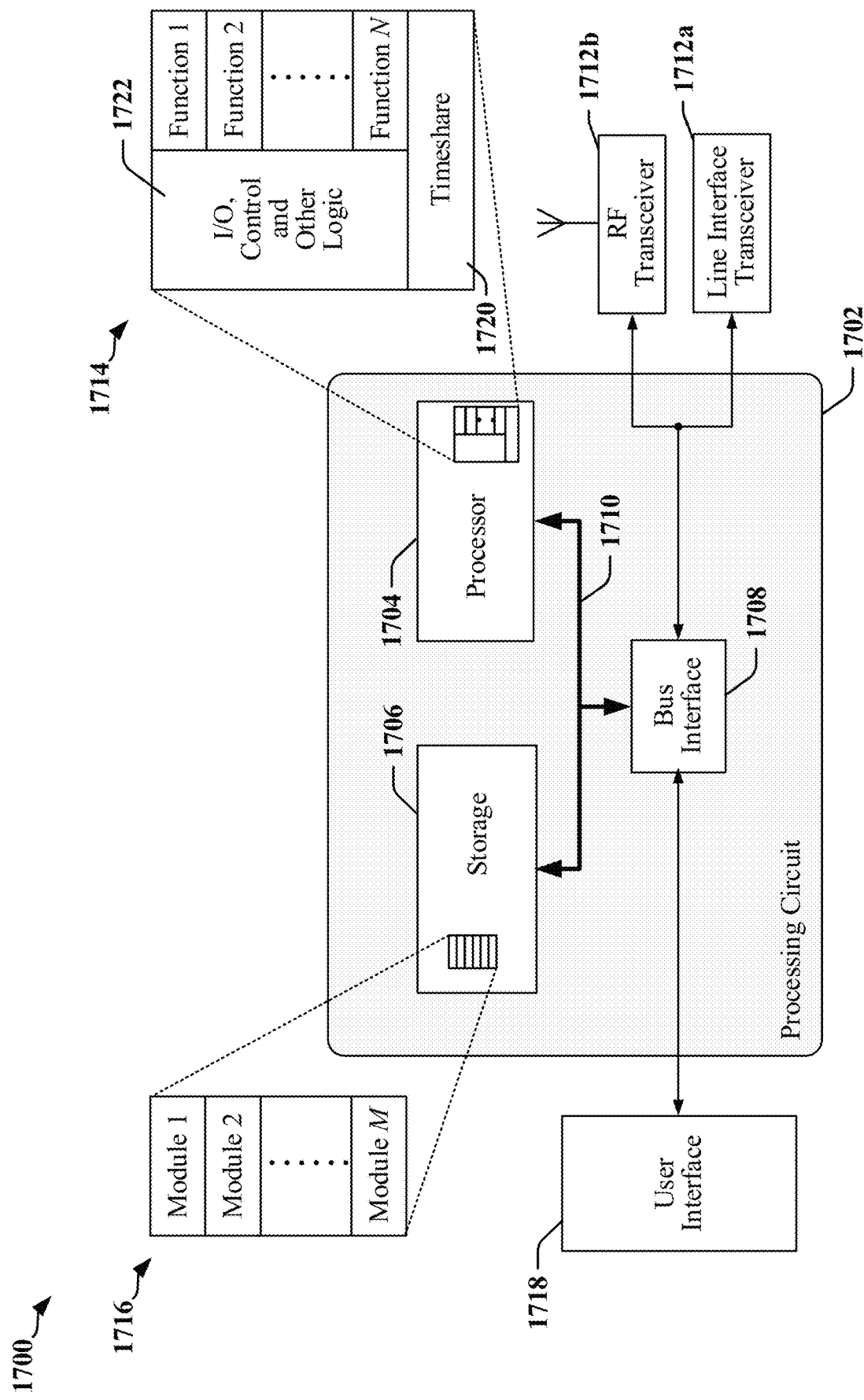
FIG. 17 illustrates one example of an apparatus employing a processing circuit that may be adapted according to certain aspects disclosed herein.

FIG. 17 is a diagram illustrating an example of a hardware implementation for an apparatus 1700. In some examples, the apparatus 1700 may perform one or more functions disclosed herein. In accordance with various aspects of the disclosure, an element, or any portion of an element, or any combination of elements as disclosed herein may be implemented using a processing circuit 1702. The processing circuit 1702 may include one or more processors 1704 that are controlled by some combination of hardware and software modules. Examples of processors 1704 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712*a*, 1712*b*. A transceiver 1712*a*, 1712*b* may be provided for each networking technology supported by the processing circuit. In some instances, multiple networking technologies may share some or all of the circuitry or processing modules found in a transceiver 1712*a*, 1712*b*. Each transceiver 1712*a*, 1712*b* provides a means for communicating with various other apparatus over a transmission medium. In one example, a transceiver 1712*a* may be used to couple the apparatus 1700 to a multi-wire bus. In another example, a transceiver 1712*b* may be used to connect the apparatus 1700 to a radio access network. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer-readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit

1702 to enable performance of the various functions disclosed herein. For example, some software modules 1716 may configure internal devices and/or logic circuits 1722 of the processor 1704, and may manage access to external devices such as a transceiver 1712*a*, 1712*b*, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to a transceiver 1712*a*, 1712*b*, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712*a*, 1712*b*, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
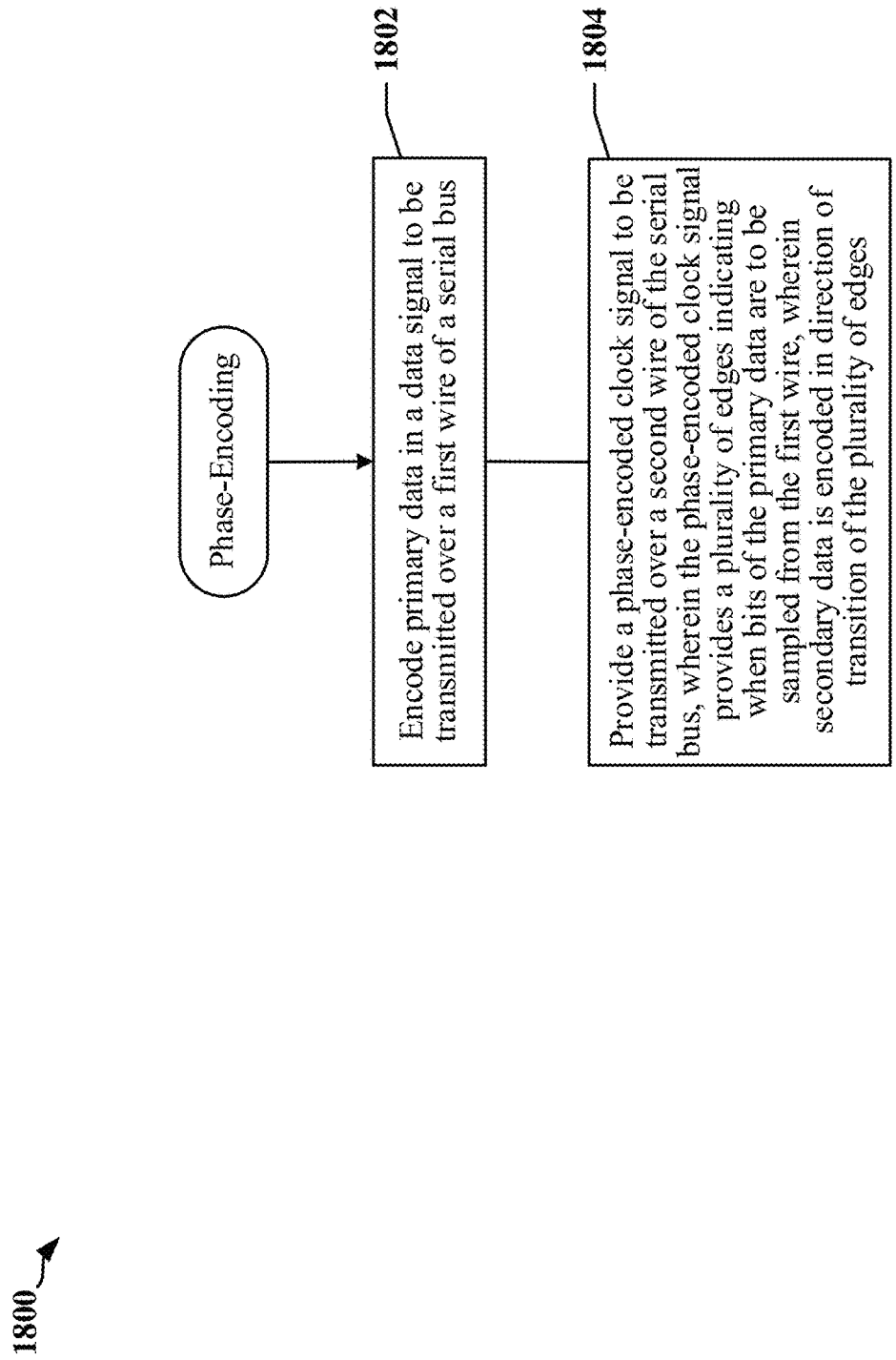
FIG. 18 is a flowchart illustrating a first example of a method that may be performed in accordance with certain aspects disclosed herein.

FIG. 18 is a flowchart 1800 of a phase-encoding method that may be performed by a device coupled to a serial bus. The serial bus may be operated in accordance with an I3C, RFFE, SPMI or other protocol. At block 1802, the device may encode primary data in a data signal to be transmitted over a first wire of a serial bus. At block 1804, the device may provide a phase-encoded clock signal to be transmitted over a second wire of the serial bus. The phase-encoded clock signal may provide a plurality of edges indicating when bits of the primary data are to be sampled from the first wire. The secondary data may be encoded in direction of transition of the plurality of edges.

In certain examples, the device may provide an internal clock signal that controls timing of communication over the serial bus. The device may transmit the data signal over the first wire of the serial bus such that one bit of data is transmitted for each clock cycle of the internal clock signal. The device may phase encode the internal clock signal using the secondary data to generate the phase-encoded clock signal to be transmitted over the second wire of the serial bus. In one example, each of the plurality of edges occurs at a mid-point of a corresponding clock cycle of the internal clock signal. The data signal may be transmitted as an SDR signal over the first wire of the serial bus.

Figure 19:
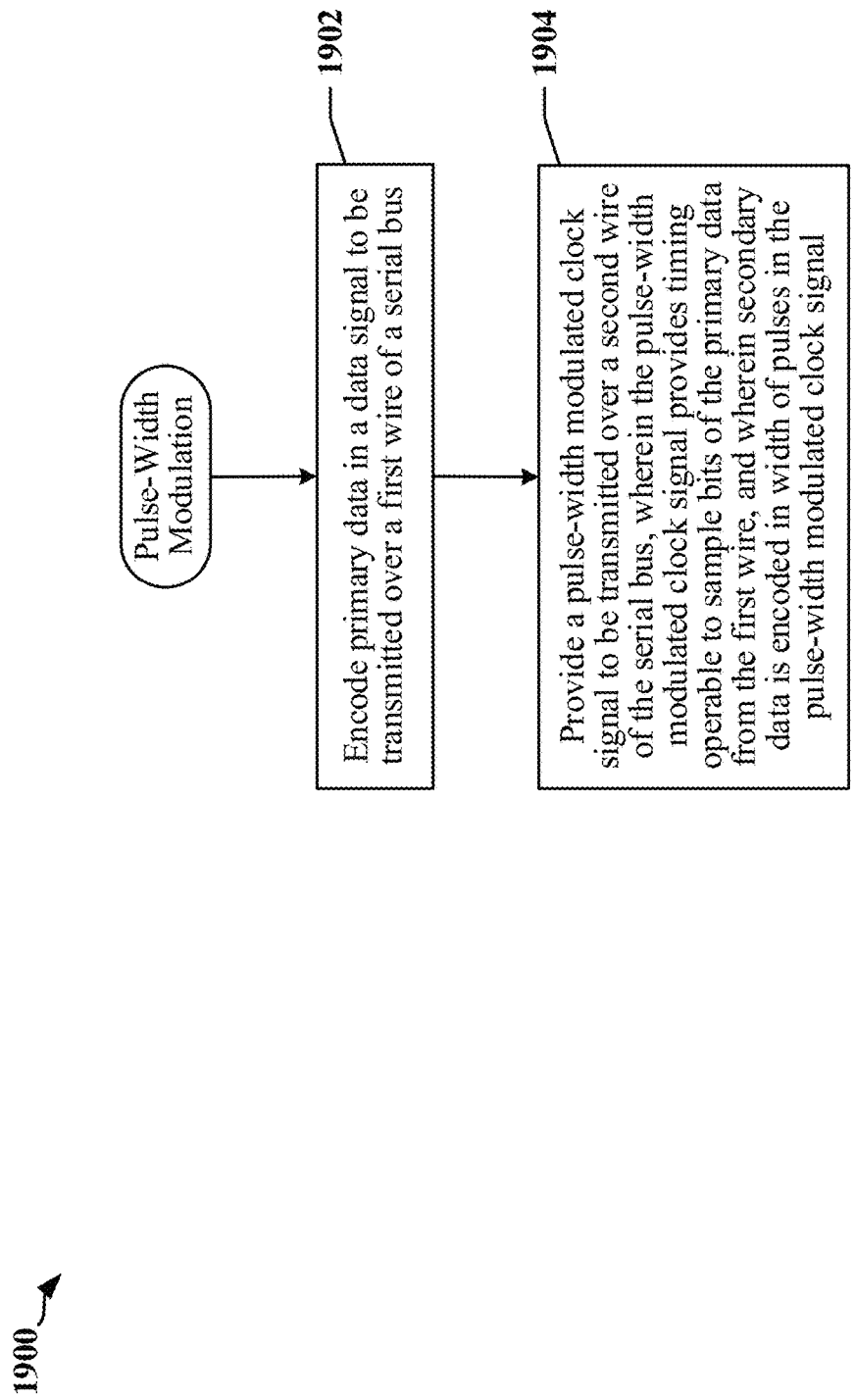
FIG. 19 is a flowchart illustrating a second example of a method that may be performed in accordance with certain aspects disclosed herein.

FIG. 19 is a flowchart 1900 of a method involving pulse-width modulation. The method may be performed by a device coupled to a serial bus. The serial bus may be operated in accordance with an I3C, RFFE, SPMI or other protocol. At block 1902, the device may encode primary data in a data signal to be transmitted over a first wire of a serial bus. At block 1904, the device may provide a pulse-width modulated clock signal to be transmitted over a second wire of the serial bus. The pulse-width modulated clock signal may provide timing operable to sample bits of the primary data from the first wire. Secondary data may be encoded in width of pulses in the pulse-width modulated clock signal.

In certain implementations, the device may provide an internal clock signal that controls timing of communication over the serial bus, and transmit the data signal over the first wire of the serial bus such that one bit of data is transmitted for each clock cycle of the internal clock signal. The device may pulse-width modulate the internal clock signal using the secondary data to generate the pulse-width modulated clock signal to be transmitted over the second wire of the serial bus. The data signal may be transmitted at a single data rate over the first wire of the serial bus.

Figure 20:
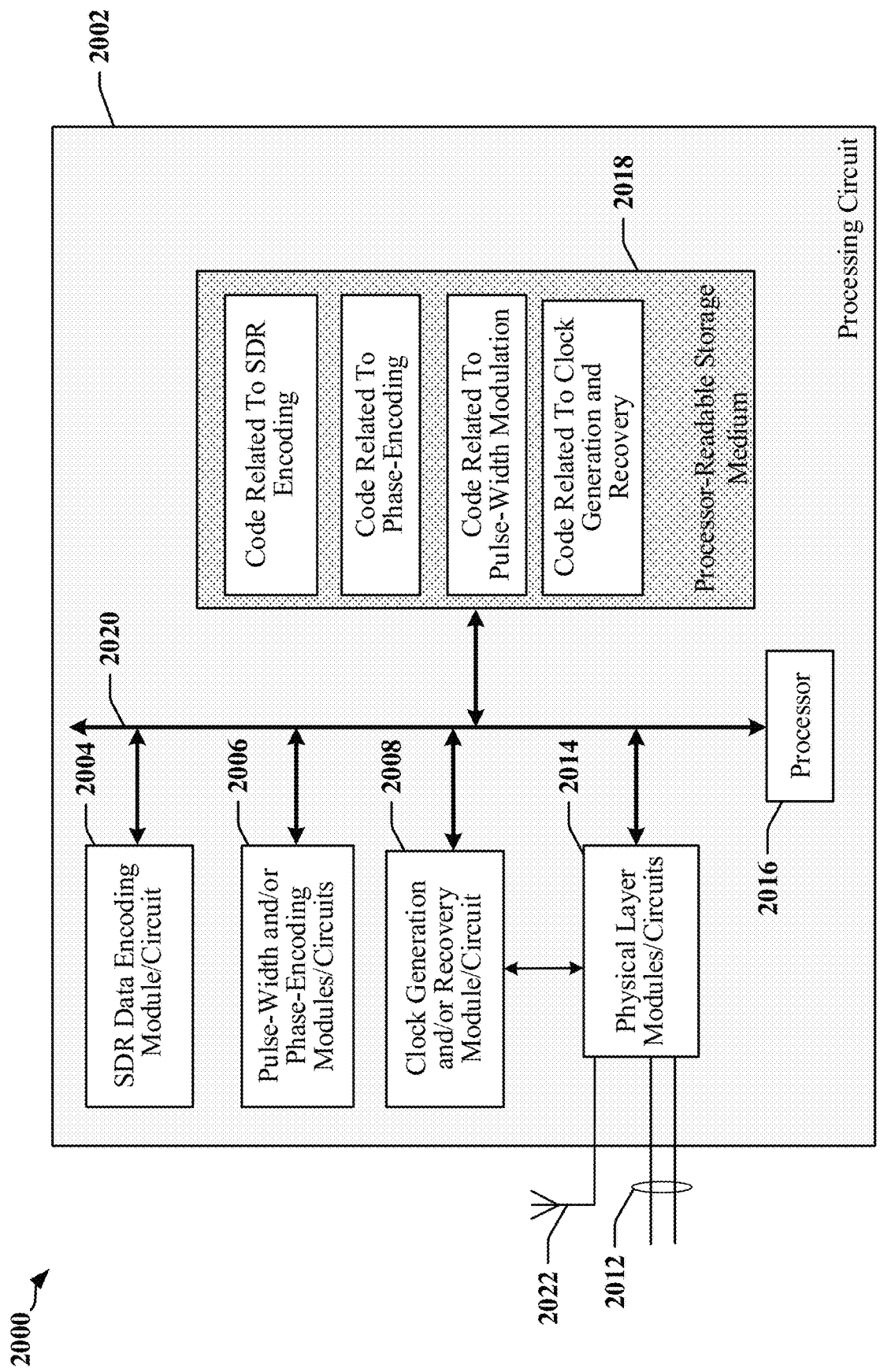
FIG. 20 illustrates a first example of a hardware implementation for an apparatus adapted in accordance with certain aspects disclosed herein.

FIG. 20 is a diagram illustrating a simplified example of a hardware implementation for an apparatus 2000 employing a processing circuit 2002. The processing circuit typically has a controller or processor 2016 that may include one or more microprocessors, microcontrollers, digital signal processors, sequencers and/or state machines. The processing circuit 2002 may be implemented with a bus architecture, represented generally by the bus 2020. The bus 2020 may include any number of interconnecting buses and bridges depending on the specific application of the processing circuit 2002 and the overall design constraints. The bus 2020 links together various circuits including one or more processors and/or hardware modules, represented by the controller or processor 2016, the modules or circuits 2004, 2006 and 2008, and the processor-readable storage medium 2018. One or more physical layer circuits and/or modules 2014 may be provided to support communications over a communication link implemented using a multi-wire bus 2012, through an antenna 2022 (to a radio access network for example), and so on. The bus 2020 may also link various other circuits such as timing sources, peripherals, voltage regulators, and power management circuits, which are well known in the art, and therefore, will not be described any further.

The processor 2016 is responsible for general processing, including the execution of software, code and/or instructions stored on the processor-readable storage medium 2018. The processor-readable storage medium 2018 may include a non-transitory storage medium. The software, when executed by the processor 2016, causes the processing circuit 2002 to perform the various functions described supra for any particular apparatus. The processor-readable storage medium 2018 may be used for storing data that is manipulated by the processor 2016 when executing software. The processing circuit 2002 further includes at least one of the modules 2004, 2006 and 2008. The modules 2004, 2006 and 2008 may be software modules running in the processor 2016, resident/stored in the processor-readable storage medium 2018, one or more hardware modules coupled to the processor 2016, or some combination thereof. The modules 2004, 2006 and 2008 may include microcontroller instructions, state machine configuration parameters, or some combination thereof.

In one configuration, the apparatus 2000 includes modules and/or circuits 2004 adapted to receive first data and encode the first data in a payload for transmission in an SDR signal. The apparatus 2000 may include modules and/or circuits 2006 adapted to receive second data and phase encode the second data in a clock signal used to control transmissions over the serial bus. The apparatus 2000 may include modules and/or circuits 2008 adapted to generate or recover clock signals used to encode, decode and transmit data signals transmitted over the serial bus.

In one example, the physical layer circuits and/or modules 2014 of the apparatus 2000 implement an interface circuit adapted to couple the apparatus 2000 to the multi-wire bus 2012. The apparatus 2000 may have a first data encoder configured to encode primary data in a data signal to be transmitted over a first wire of the multi-wire bus 2012, and a second data encoder configured to provide a phase-encoded clock signal to be transmitted over a second wire of the multi-wire bus 2012. The phase-encoded clock signal may provide a plurality of edges indicating when bits of the primary data are to be sampled from the first wire. Secondary data may be encoded in direction of transition of the plurality of edges.

The apparatus 2000 may have a clock generation circuit configured to provide an internal clock signal that controls timing of communication over the serial bus. One bit of data may be transmitted for each clock cycle of the internal clock signal when the data signal is transmitted over the first wire of the serial bus. The second data encoder may be further configured to phase encode the internal clock signal using the secondary data to generate the phase-encoded clock signal to be transmitted over the second wire of the serial bus. In some implementations, each of the plurality of edges occurs at a mid-point of a corresponding clock cycle of the internal clock signal.

In another example, the processor-readable storage medium 2018 includes or maintains instructions for encoding primary data in a data signal to be transmitted over a first wire of the serial bus, providing a phase-encoded clock signal to be transmitted over a second wire of the serial bus. The phase-encoded clock signal may provide a plurality of edges indicating when bits of the primary data are to be sampled from the first wire. The secondary data may be encoded in direction of transition of the plurality of edges.

In certain examples, the device may provide an internal clock signal that controls timing of communication over the serial bus. The device may transmit the data signal over the first wire of the serial bus such that one bit of data is transmitted for each clock cycle of the internal clock signal. The device may phase encode the internal clock signal using the secondary data to generate the phase-encoded clock signal to be transmitted over the second wire of the serial bus. In one example, each of the plurality of edges occurs at a mid-point of a corresponding clock cycle of the internal clock signal. The data signal may be transmitted as an SDR signal over the first wire of the serial bus.

In another example, the processor-readable storage medium 2018 includes or maintains instructions for encoding primary data in a data signal to be transmitted over a first wire of a serial bus, and providing a pulse-width modulated clock signal to be transmitted over a second wire of the serial bus. The pulse-width modulated clock signal may provide timing operable to sample bits of the primary data from the first wire. The secondary data may be encoded in width of pulses in the pulse-width modulated clock signal.

The processor-readable storage medium 2018 may include or maintain instructions for providing an internal clock signal that controls timing of communication over the serial bus, and transmitting the data signal over the first wire of the serial bus such that one bit of data is transmitted for each clock cycle of the internal clock signal. The processor-readable storage medium 2018 may include or maintain instructions for pulse-width modulating the internal clock signal using the secondary data to generate the pulse-width modulated clock signal to be transmitted over the second wire of the serial bus.

Figure 21:
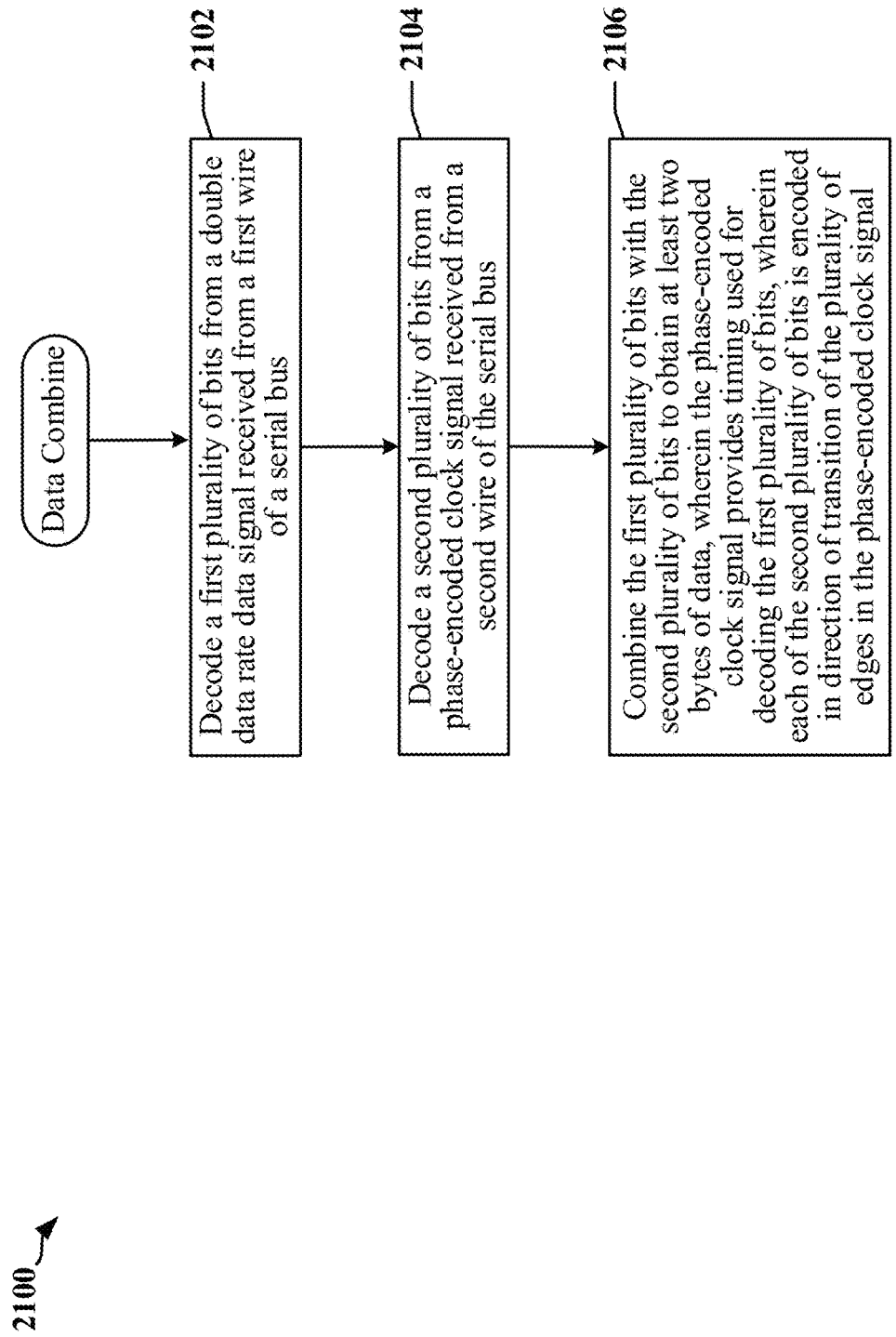
FIG. 21 is a flowchart illustrating a second example of a method that may be performed in accordance with certain aspects disclosed herein.

FIG. 21 is a flowchart 2100 of a method for data combination that may be performed by a device coupled to a serial bus. The serial bus may be operated in accordance with an I3C, RFFE, SPMI or other protocol. At block 2102, the device may decode a first plurality of bits from a double data rate data signal received from a first wire of a serial bus. At block 2104, the device may decode a second plurality of bits from a phase-encoded clock signal received from a second wire of the serial bus. At block 2106, the device may combine the first plurality of bits with the second plurality of bits to obtain at least two bytes of data. The phase-encoded clock signal may provide timing used for decoding the first plurality of bits. In one example, each of the second plurality of bits is encoded in direction of transition of the plurality of edges.

In one example, the device may decode the first plurality of bits from the double data rate data signal by determining whether a transition in signaling state of the first wire occurred between two consecutively received bits, sampling the signaling state of the first wire to define the value of both consecutively received bits when no transition in signaling state of the first wire occurred, and defining values of both consecutively received bits based on direction of the transition when the transition in signaling state of the first wire occurred.

In certain examples, combining the first plurality of bits with the second plurality of bits includes interleaving the first plurality of bits with the second plurality of bits to obtain the at least two bytes of data. The at least two bytes of data may be sequentially received from the serial bus. The at least two bytes of data may be transmitted independently such that a transmission error affecting a first byte does not affect a second byte.

Figure 22:
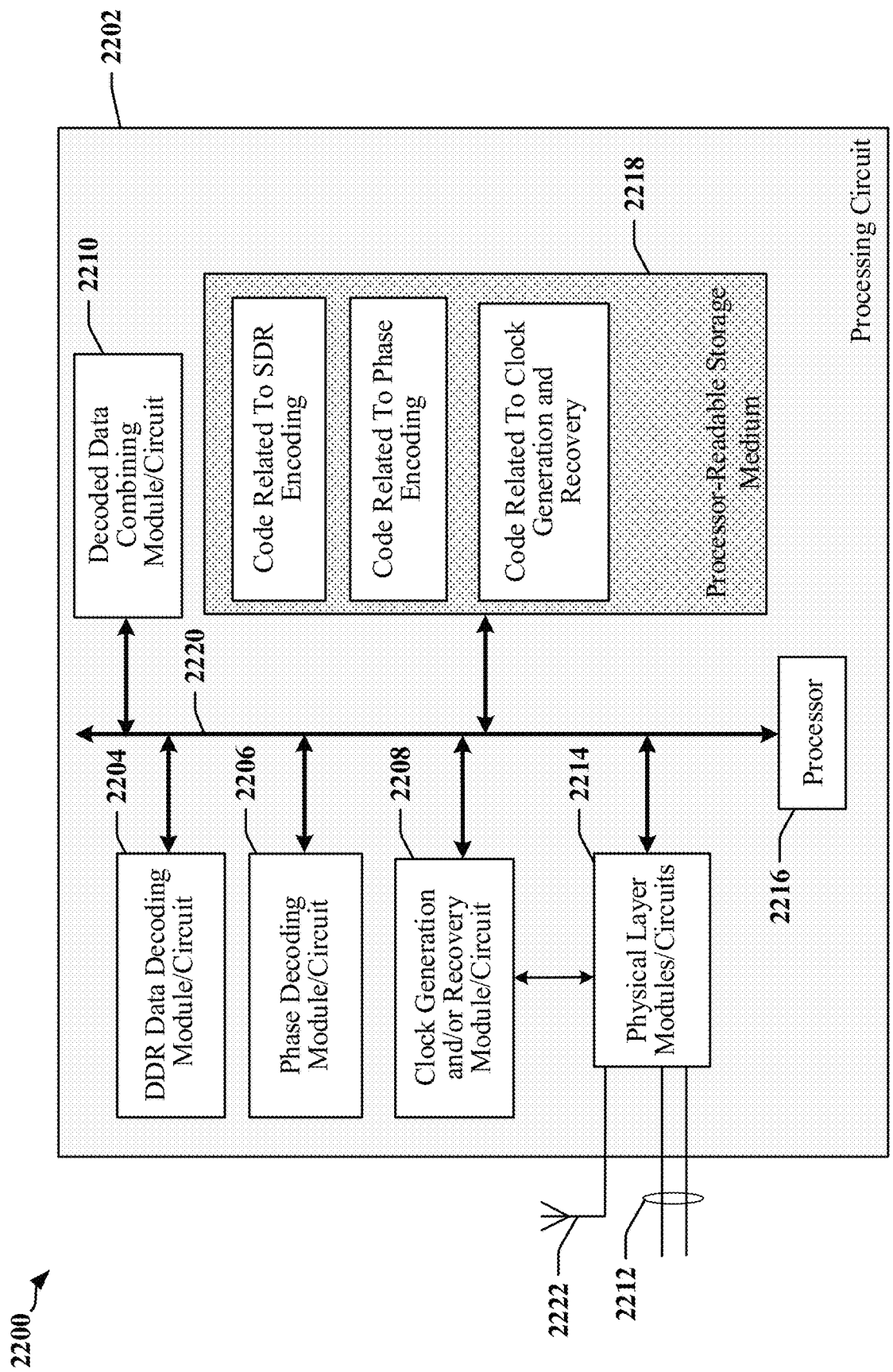
FIG. 22 illustrates a second example of a hardware implementation for an apparatus adapted in accordance with certain aspects disclosed herein.

FIG. 22 is a diagram illustrating a simplified example of a hardware implementation for an apparatus 2200 employing a processing circuit 2202. The processing circuit typically has a controller or processor 2216 that may include one or more microprocessors, microcontrollers, digital signal processors, sequencers and/or state machines. The processing circuit 2202 may be implemented with a bus architecture, represented generally by the bus 2220. The bus 2220 may include any number of interconnecting buses and bridges depending on the specific application of the processing circuit 2202 and the overall design constraints. The bus 2220 links together various circuits including one or more processors and/or hardware modules, represented by the controller or processor 2216, the modules or circuits 2204, 2206, 2208 and 2210, and the processor-readable storage medium 2218. One or more physical layer circuits and/or modules 2214 may be provided to support communications over a communication link implemented using a multi-wire bus 2212, through an antenna 2222 (to a radio access network for example), and so on. The bus 2220 may also link various other circuits such as timing sources, peripherals, voltage regulators, and power management circuits, which are well known in the art, and therefore, will not be described any further.

The processor 2216 is responsible for general processing, including the execution of software, code and/or instructions stored on the processor-readable storage medium 2218. The processor-readable storage medium 2218 may include a non-transitory storage medium. The software, when executed by the processor 2216, causes the processing circuit 2202 to perform the various functions described supra for any particular apparatus. The processor-readable storage medium 2218 may be used for storing data that is manipulated by the processor 2216 when executing software. The processing circuit 2202 further includes at least one of the modules 2204, 2206, 2208 and 2210. The modules 2204, 2206, 2208 and 2210 may be software modules running in the processor 2216, resident/stored in the processor-readable storage medium 2218, one or more hardware modules coupled to the processor 2216, or some combination thereof. The modules 2204, 2206, 2208 and 2210 may include microcontroller instructions, state machine configuration parameters, or some combination thereof.

In one configuration, the apparatus 2200 includes modules and/or circuits 2204 adapted to decode first data from a DDR signal. The apparatus 2200 may include modules and/or circuits 2206 adapted to decode second data from a phase-encoded clock signal used to control transmissions of the first data over the serial bus. The apparatus 2200 may include modules and/or circuits 2208 adapted to recover clock signals used to decode the first data and the second data. The apparatus 2200 may include modules and/or circuits 2210 adapted to combine the first data with the second data.

In one example, the physical layer circuits and/or modules 2214 of the apparatus 2200 implement an interface circuit adapted to couple the apparatus 2200 to the multi-wire bus 2212. The apparatus 2200 may have a first data decoder circuit configured to decode a first plurality of bits from a double data rate data signal received from a first wire of the multi-wire bus. The apparatus 2200 may have a second data decoder circuit configured to decode a second plurality of bits from a phase-encoded clock signal received from a second wire of the multi-wire bus. The apparatus 2200 may have a data combiner circuit configured to combine the first plurality of bits with the second plurality of bits to obtain at least two bytes of data. The phase-encoded clock signal may provide timing used for decoding the first plurality of bits. Each bit of the second plurality of bits is encoded in direction of transition of the plurality of edges.

The first data decoder circuit may include a vector detection circuit and a level detection circuit. The vector detection circuit may be configured to determine whether a transition in signaling state of the first wire occurred between two consecutively received bits, and define values of both consecutively received bits based on direction of the transition when the transition in signaling state of the first wire occurred. The level detection circuit may be configured to sample the signaling state of the first wire to define the value of both consecutively received bits when no transition in signaling state of the first wire occurred.

The data combiner circuit may be further configured to interleave the first plurality of bits with the second plurality of bits to obtain the at least two bytes of data. The at least two bytes of data may be received sequentially from the serial bus.

The apparatus 2200 may have a clock generation circuit configured to provide one or more clocks used to decode the first plurality of bits and the second plurality of bits.

The serial bus may be operated in accordance with an I3C, RFFE and/or SPMI protocol.

In another example, the processor-readable storage medium 2218 may include code for decoding a first plurality of bits from a double data rate data signal received from a first wire of the serial bus, decoding a second plurality of bits from a phase-encoded clock signal received from a second wire of the serial bus, and combining the first plurality of bits with the second plurality of bits to obtain at least two bytes of data. The phase-encoded clock signal may provide timing used for decoding the first plurality of bits. Each of the second plurality of bits may be encoded in the direction of transition of edges in the phase-encoded clock signal.

The processor-readable storage medium 2218 may include code for determining whether a transition in signaling state of the first wire occurred between two consecutively received bits, sampling the signaling state of the first wire to define values of both consecutively received bits when no transition in signaling state of the first wire occurred, and defining the values of both consecutively received bits based on direction of the transition when the transition in signaling state of the first wire occurred.

The processor-readable storage medium 2218 may include code for interleaving the first plurality of bits with the second plurality of bits to obtain the at least two bytes of data. Bytes of data may be sequentially received from the serial bus. Bytes of data may be transmitted independently such that a transmission error affecting a first byte does not affect a second byte.

Figure 23:
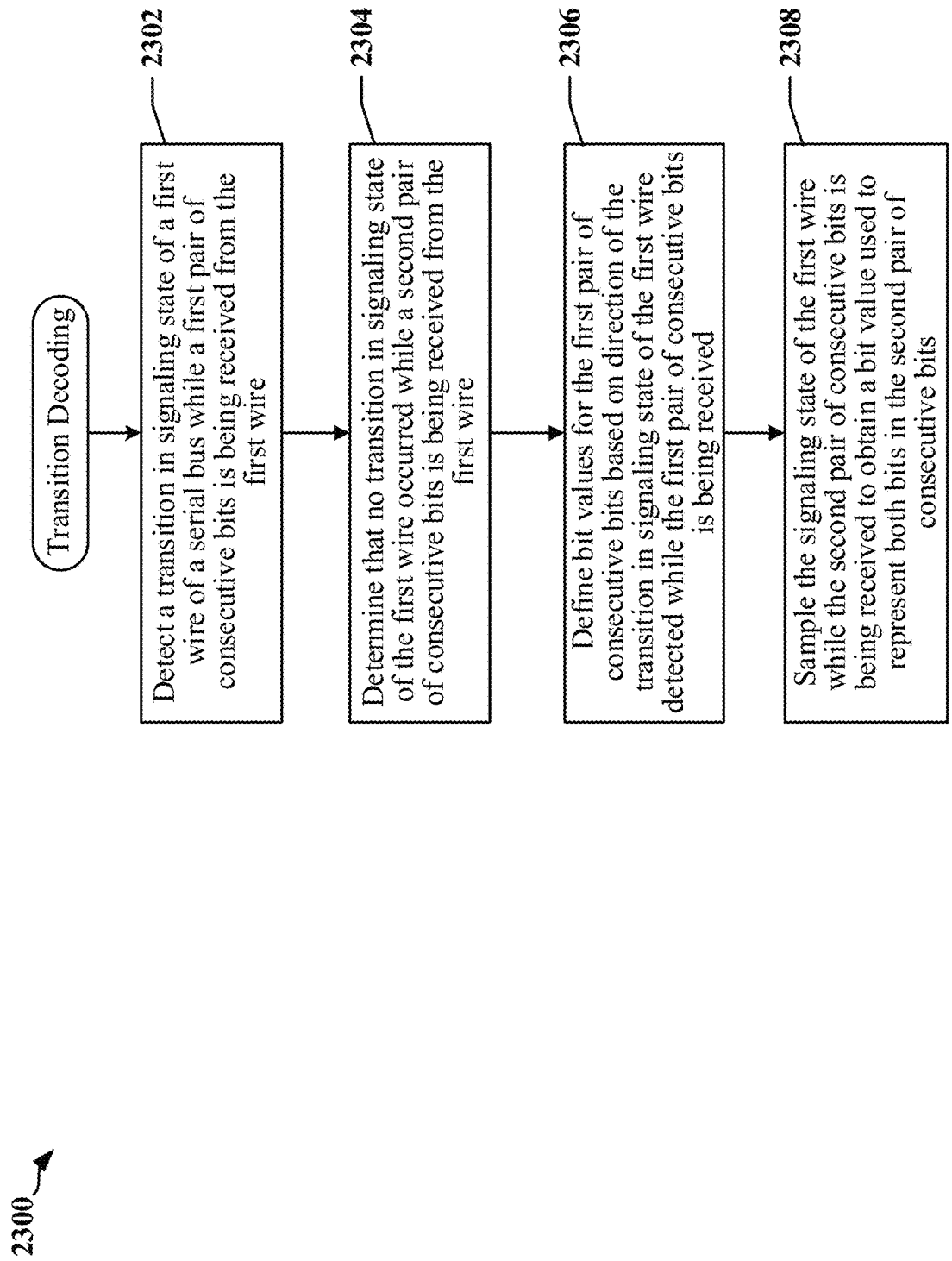
FIG. 23 is a flowchart illustrating a third example of a method that may be performed in accordance with certain aspects disclosed herein.

FIG. 23 is a flowchart 2300 of a method that may be performed by a device coupled to a serial bus. The serial bus may be operated in accordance with an I3C, RFFE, SPMI or other protocol. At block 2302, the device may detect a transition in signaling state of a first wire of a serial bus while a first pair of consecutive bits is being received from the first wire of the serial bus. At block 2304, the device may determine that no transition in signaling state of the first wire occurred while a second pair of consecutive bits is being received from the first wire. At block 2306, the device may define bit values for the first pair of consecutive bits based on direction of the transition in signaling state of the first wire detected while the first pair of consecutive bits is being received. At block 2308, the device may sample the signaling state of the first wire while the second pair of consecutive bits is being received to obtain a bit value used to represent both bits in the second pair of consecutive bits. In some instances, the first pair of consecutive bits may be received in a DDR data signal.

In one example, the transition in signaling state of the first wire occurs when the first pair of consecutive bits have different bit values.

In various examples, the first pair of consecutive bits is received during a first cycle of a clock signal transmitted on a second wire of the serial bus. The transition in signaling state of the first wire may be detected during a sampling window associated with the first cycle of the clock signal and defined for an SDR protocol. The second pair of consecutive bits may be received during a second cycle of the clock signal transmitted on the second wire of the serial bus. The signaling state of the first wire may be sampled during a sampling window associated with the second cycle of the clock signal and defined for the SDR protocol.

In certain examples, the first pair of consecutive bits and the second pair of consecutive bits is combined in a received data byte at a data decoder circuit. The bit values in the first pair of consecutive bits and the second pair of consecutive bits may be binarily inverted when transmissions on the serial bus are polarity inverted. An edge detection signal received by the data decoder circuit may be used to select between bit values for each pair of consecutive bits from bit values obtained by sampling the signaling state of the first wire and bit values defined based on direction of a transition in signaling state while the second pair of consecutive bits is being received.

Figure 24:
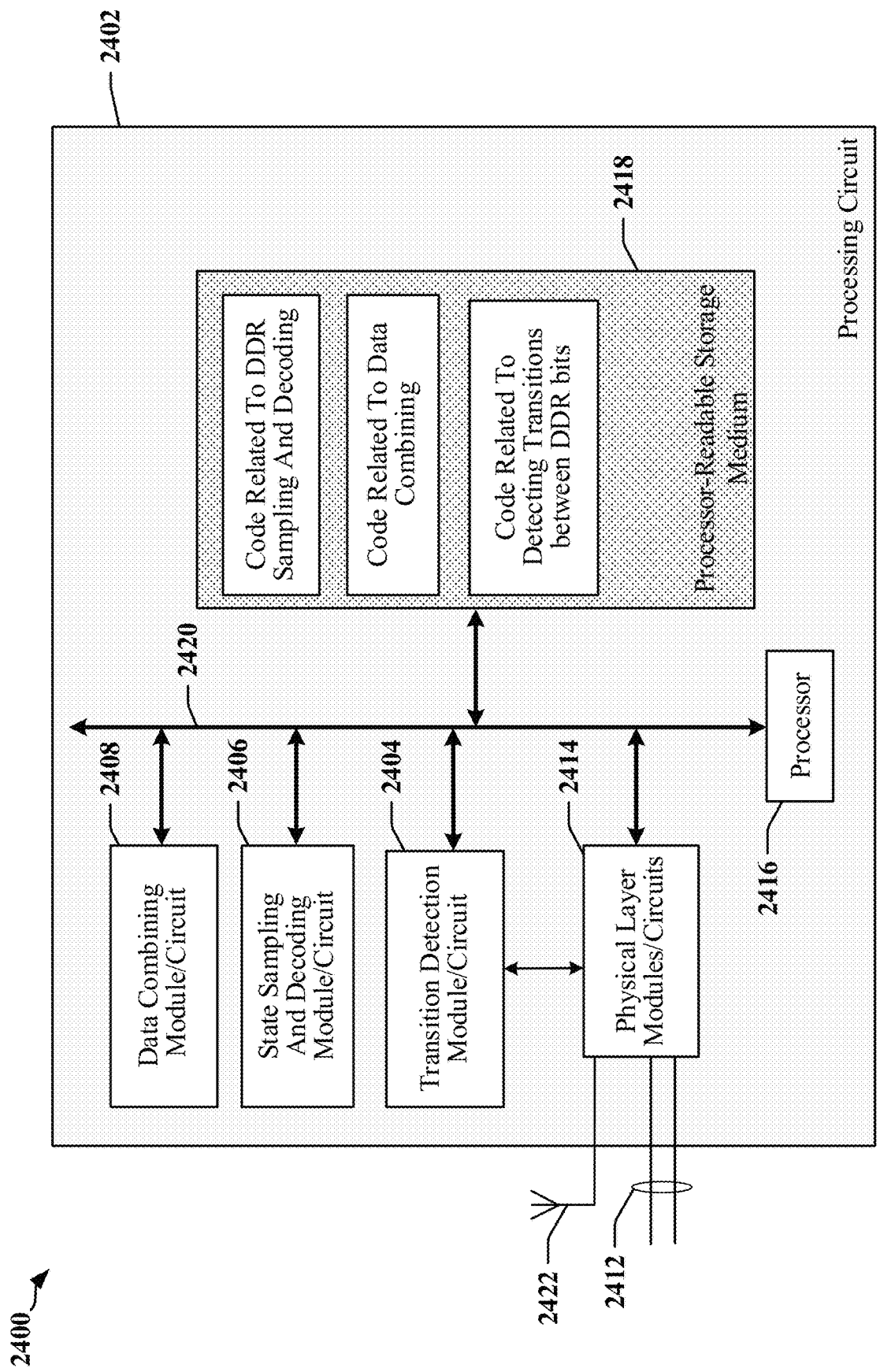
FIG. 24 illustrates a third example of a hardware implementation for an apparatus adapted in accordance with certain aspects disclosed herein.

FIG. 24 is a diagram illustrating a simplified example of a hardware implementation for an apparatus 2400 employing a processing circuit 2402. The processing circuit typically has a controller or processor 2416 that may include one or more microprocessors, microcontrollers, digital signal processors, sequencers and/or state machines. The processing circuit 2402 may be implemented with a bus architecture, represented generally by the bus 2420. The bus 2420 may include any number of interconnecting buses and bridges depending on the specific application of the processing circuit 2402 and the overall design constraints. The bus 2420 links together various circuits including one or more processors and/or hardware modules, represented by the controller or processor 2416, the modules or circuits 2404, 2406 and 2408 and the processor-readable storage medium 2418. One or more physical layer circuits and/or modules 2414 may be provided to support communications over a communication link implemented using a multi-wire bus 2412, through an antenna 2422 (to a radio access network for example), and so on. The bus 2420 may also link various other circuits such as timing sources, peripherals, voltage regulators, and power management circuits, which are well known in the art, and therefore, will not be described any further.

The processor 2416 is responsible for general processing, including the execution of software, code and/or instructions stored on the processor-readable storage medium 2418. The processor-readable storage medium 2418 may include a non-transitory storage medium. The software, when executed by the processor 2416, causes the processing circuit 2402 to perform the various functions described supra for any particular apparatus. The processor-readable storage medium 2418 may be used for storing data that is manipulated by the processor 2416 when executing software. The processing circuit 2402 further includes at least one of the modules 2404, 2406 and 2408. The modules 2404, 2406 and 2408 may be software modules running in the processor 2416, resident/stored in the processor-readable storage medium 2418, one or more hardware modules coupled to the processor 2416, or some combination thereof. The modules 2404, 2406 and 2408 may include microcontroller instructions, state machine configuration parameters, or some combination thereof.

In one configuration, the apparatus 2400 includes modules and/or circuits 2404 adapted to detect transitions in signaling state on a data wire between DDR bits. The apparatus 2400 may include modules and/or circuits 2406 adapted to sample signaling state of data wire. The apparatus 2400 may include modules and/or circuits 2408 adapted to select between sampled data and a direction of transition to define bits to represent pairs of consecutive DDR bits.

In one example, the physical layer circuits and/or modules 2414 of the apparatus 2400 implement an interface circuit adapted to couple the apparatus 2400 to the multi-wire bus 2412. The apparatus 2400 may have a transition detector circuit and a state sampling circuit. The transition detector circuit may be configured to detect a transition in signaling state of a first wire of the serial bus while a first pair of consecutive bits is being received from the first wire of the serial bus, and determine that no transition in signaling state of the first wire occurred while a second pair of consecutive bits is being received from the first wire. The state sampling circuit may be configured to sample the signaling state of the first wire while the second pair of consecutive bits is being received, and provide a sampled bit value derived from the sampled signaling state to represent bit value for both bits in the second pair of consecutive bits. The first pair of consecutive bits and the second pair of consecutive bits may be received in a DDR data signal.

The transition in signaling state of the first wire may occur when the first pair of consecutive bits have different bit values.

The first pair of consecutive bits may be received during a first cycle of a clock signal transmitted on a second wire of the serial bus, and the transition in signaling state of the first wire may be detected during a sampling window associated with the first cycle of the clock signal and defined for an SDR protocol. The second pair of consecutive bits may be received during a second cycle of the clock signal transmitted on the second wire of the serial bus. The signaling state of the first wire may be sampled during a sampling window associated with the second cycle of the clock signal and defined for the SDR protocol. The apparatus may have a data decoder circuit configured to combine the first pair of consecutive bits and the second pair of consecutive bits in a received data byte at a data decoder circuit. The data decoder circuit may be further configured to binarily invert the bit values in the first pair of consecutive bits and the second pair of consecutive bits when transmissions on the serial bus are polarity inverted. The data decoder circuit may be further configured to use an edge detection signal received by the data decoder circuit to select between bit values for each pair of consecutive bits from bit values obtained by sampling the signaling state of the first wire and bit values defined based on direction of a transition in signaling state while the second pair of consecutive bits is being received.

In another example, the processor-readable storage medium 2418 stores code for detecting a transition in signaling state of a first wire of a serial bus while a first pair of consecutive bits is being received from the first wire of the serial bus, determining that no transition in signaling state of the first wire occurred while a second pair of consecutive bits is being received from the first wire, defining bit values for the first pair of consecutive bits based on direction of the transition in signaling state of the first wire detected while the first pair of consecutive bits is being received, and sampling the signaling state of the first wire while the second pair of consecutive bits is being received to obtain a bit value used to represent both bits in the second pair of consecutive bits. In some instances, the first pair of consecutive bits may be received in a DDR data signal.

In one example, the transition in signaling state of the first wire occurs when the first pair of consecutive bits have different bit values. In various examples, the first pair of consecutive bits is received during a first cycle of a clock signal transmitted on a second wire of the serial bus. The transition in signaling state of the first wire may be detected during a sampling window associated with the first cycle of the clock signal and defined for an SDR protocol. The second pair of consecutive bits may be received during a second cycle of the clock signal transmitted on the second wire of the serial bus. The signaling state of the first wire may be sampled during a sampling window associated with the second cycle of the clock signal and defined for the SDR protocol.

In certain examples, the first pair of consecutive bits and the second pair of consecutive bits is combined in a received data byte at a data decoder circuit. The bit values in the first pair of consecutive bits and the second pair of consecutive bits may be binarily inverted when transmissions on the serial bus are polarity inverted. An edge detection signal received by the data decoder circuit may be used to select between bit values for each pair of consecutive bits from bit values obtained by sampling the signaling state of the first wire and bit values defined based on direction of a transition in signaling state while the second pair of consecutive bits is being received.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed:

1. A method of data communication, comprising:
   detecting a transition in signaling state of a first wire of a serial bus while a first pair of consecutive bits is being received from the first wire;
   determining that no transition in the signaling state of the first wire occurred while a second pair of consecutive bits is being received from the first wire;
   defining bit values for the first pair of consecutive bits based on direction of the transition in the signaling state of the first wire detected while the first pair of consecutive bits is being received; and
   sampling the signaling state of the first wire while the second pair of consecutive bits is being received to obtain a bit value used to represent both bits in the second pair of consecutive bits.

2. The method of claim 1, wherein the transition in the signaling state of the first wire occurs when the first pair of consecutive bits have different bit values.

3. The method of claim 1, wherein the first pair of consecutive bits is received during a first cycle of a clock signal transmitted on a second wire of the serial bus, and wherein the transition in the signaling state of the first wire is detected during a sampling window associated with the first cycle of the clock signal and defined for a single data rate protocol.

4. The method of claim 3, wherein the second pair of consecutive bits is received during a second cycle of the clock signal transmitted on the second wire of the serial bus, and wherein the signaling state of the first wire is sampled during a sampling window associated with the second cycle of the clock signal and defined for the single data rate protocol.

5. The method of claim 1, further comprising:
   combining the first pair of consecutive bits and the second pair of consecutive bits in a first plurality of bits at a data decoder circuit.

6. The method of claim 5, further comprising:
   binarily inverting bit values in the first pair of consecutive bits and the second pair of consecutive bits when transmissions on the serial bus are polarity inverted.

7. The method of claim 5, further comprising:
   using an edge detection signal received by the data decoder circuit to select between bit values for each pair of consecutive bits from bit values obtained by sampling the signaling state of the first wire and bit values defined based on direction of a transition in the signaling state while the second pair of consecutive bits is being received.

8. The method of claim 5, further comprising:
   decoding a second plurality of bits from an encoded clock signal received from a second wire of the serial bus, wherein the clock signal is encoded using pulse-width modulation or phase encoding; and
   combining the first plurality of bits with the second plurality of bits to obtain at least two bytes of data, wherein the clock signal provides timing used for decoding the first plurality of bits, and
   wherein each of the second plurality of bits is encoded in direction of transition of edges in the clock signal.

9. The method of claim 8, wherein combining the first plurality of bits with the second plurality of bits comprises:
   interleaving the first plurality of bits with the second plurality of bits to obtain a first received data byte and a second received data byte.

10. The method of claim 8, wherein the at least two bytes of data are sequentially received from the serial bus.

11. The method of claim 8, wherein the at least two bytes of data are transmitted independently such that a transmission error affecting a first byte of the at least two bytes of data does not affect a second byte of the at least two bytes of data.

12. The method of claim 1, wherein the serial bus is operated in accordance with an Improved Inter-Integrated Circuit (I3C), a radio frequency front-end or a system power management interface single data rate data protocol.

13. The method of claim 1, wherein the serial bus is operated in accordance with an Improved Inter-Integrated Circuit (I3C), a radio frequency front-end or a system power management interface double data rate data protocol.

14. An apparatus for data communication comprising:
   an interface circuit adapted to couple the apparatus to a serial bus;
   a transition detector circuit configured to:
      detect a transition in signaling state of a first wire of the serial bus while a first pair of consecutive bits is being received from the first wire, wherein bit values for the first pair of consecutive bits are defined based on direction of the transition in the signaling state of the first wire; and determine that no transition in the signaling state of the first wire occurred while a second pair of consecutive bits is being received from the first wire; and a state sampling circuit configured to:
sample the signaling state of the first wire while the second pair of consecutive bits is being received; and
provide a sampled bit value derived from the sampled signaling state to represent a bit value for both bits in the second pair of consecutive bits.

15. The apparatus of claim 14, wherein the first pair of consecutive bits is received during a first cycle of a clock signal transmitted on a second wire of the serial bus, and wherein the transition in the signaling state of the first wire is detected during a sampling window associated with the first cycle of the clock signal and defined for a single data rate protocol, and wherein the second pair of consecutive bits is received during a second cycle of the clock signal transmitted on the second wire of the serial bus, and wherein the signaling state of the first wire is sampled during a sampling window associated with the second cycle of the clock signal and defined for the single data rate protocol.

16. The apparatus of claim 14, further comprising:
a data decoder circuit configured to:
binarily invert bit values in the first pair of consecutive bits and the second pair of consecutive bits when transmissions on the serial bus are polarity inverted; and
combine the first pair of consecutive bits and the second pair of consecutive bits in a first plurality of bits.

17. The apparatus of claim 16, wherein the data decoder circuit is further configured to:
decode a second plurality of bits from an encoded clock signal received from a second wire of the serial bus, wherein the clock signal is encoded using pulse-width modulation or phase encoding; and
combine the first plurality of bits with the second plurality of bits to obtain at least two bytes of data,
wherein the clock signal provides timing used for decoding the first plurality of bits, and
wherein each of the second plurality of bits is encoded in direction of transition of edges in the clock signal.

18. A method of data communications, comprising:
encoding primary data in a data signal to be transmitted over a first wire of a serial bus; and
providing a phase-encoded clock signal to be transmitted over a second wire of the serial bus,
wherein the phase-encoded clock signal provides a plurality of edges indicating when bits of the primary data are to be sampled from the first wire, and
wherein secondary data is encoded in direction of transition of the plurality of edges.

19. The method of claim 18, further comprising:
providing an internal clock signal that controls timing of communication over the serial bus; and
transmitting the data signal over the first wire of the serial bus such that one bit of data is transmitted for each clock cycle of the internal clock signal.

20. The method of claim 19, further comprising:
phase encoding the internal clock signal using the secondary data to generate the phase-encoded clock signal to be transmitted over the second wire of the serial bus.

21. The method of claim 19, wherein each of the plurality of edges occurs at a mid-point of a corresponding clock cycle of the internal clock signal.

22. The method of claim 18, wherein the data signal is transmitted at a single data rate over the first wire of the serial bus.

23. The method of claim 18, wherein the serial bus is operated in accordance with an Improved Inter-Integrated Circuit (I3C), a radio frequency front-end or a system power management interface single data rate data protocol.

24. The method of claim 18, wherein the serial bus is operated in accordance with an Improved Inter-Integrated Circuit (I3C), a radio frequency front-end or a system power management interface double data rate data protocol.

25. An apparatus comprising:
an interface circuit adapted to couple the apparatus to a serial bus;
a first data encoder configured to:
encode primary data in a data signal to be transmitted over a first wire of the serial bus; and
a second data encoder configured to:
provide a phase-encoded clock signal to be transmitted over a second wire of the serial bus,
wherein the phase-encoded clock signal provides a plurality of edges indicating when bits of the primary data are to be sampled from the first wire, and
wherein secondary data is encoded in direction of transition of the plurality of edges.

26. The apparatus of claim 25, further comprising:
a clock generation circuit configured to provide an internal clock signal that controls timing of communication over the serial bus,
wherein one bit of data is transmitted for each clock cycle of the internal clock signal when the data signal is transmitted over the first wire of the serial bus.

27. The apparatus of claim 26, wherein the second data encoder is further configured to:
phase encode the internal clock signal using the secondary data to generate the phase-encoded clock signal to be transmitted over the second wire of the serial bus.

28. The apparatus of claim 26, wherein each of the plurality of edges occurs at a mid-point of a corresponding clock cycle of the internal clock signal.

29. The apparatus of claim 25, wherein the data signal is transmitted at a single data rate over the first wire of the serial bus.

30. The apparatus of claim 25, wherein the serial bus is operated in accordance with an Improved Inter-Integrated Circuit (I3C) protocol, a radio frequency front-end protocol or a system power management interface protocol.

* * * * *